(12) United States Patent
Goldfinger et al.

(10) Patent No.: US 8,626,593 B2
(45) Date of Patent: Jan. 7, 2014

(54) APPARATUS AND METHOD FOR COLLECTING AND MANIPULATING TRANSACTION DATA

(75) Inventors: Yair Goldfinger, Ramat-Hasharon (IL); Amichay Oren, St. Rosh-A-Ayin (IL)

(73) Assignee: APPCARD, Inc., Wilmington, DE (US)

( * ) Notice: Subject to any disclaimer, the term of this patent is extended or adjusted under 35 U.S.C. 154(b) by 0 days.

(21) Appl. No.: 13/599,397

(22) Filed: Aug. 30, 2012

(65) Prior Publication Data

US 2013/0054396 A1 Feb. 28, 2013

Related U.S. Application Data

(60) Provisional application No. 61/529,255, filed on Aug. 31, 2011, provisional application No. 61/584,323, filed on Jan. 9, 2012, provisional application No. 61/584,324, filed on Jan. 9, 2012.

(51) Int. Cl.
*G06Q 10/00* (2012.01)

(52) U.S. Cl.
USPC .......................................................... 705/21

(58) Field of Classification Search
None
See application file for complete search history.

(56) References Cited

U.S. PATENT DOCUMENTS

| 5,337,919 | A | 8/1994 | Spaulding et al. |
|---|---|---|---|
| 6,595,416 | B1 | 7/2003 | Newsome et al. |
| 2003/0065569 | A1 | 4/2003 | Danis et al. |
| 2003/0154383 | A9 | 8/2003 | Wiley et al. |
| 2007/0214061 | A1 | 9/2007 | Toyokawa et al. |
| 2008/0133374 | A1 | 6/2008 | Nobutani |
| 2008/0221982 | A1* | 9/2008 | Harkins et al. .................. 705/14 |
| 2008/0263363 | A1 | 10/2008 | Jueneman et al. |
| 2009/0327045 | A1 | 12/2009 | Olives et al. |
| 2010/0301113 | A1 | 12/2010 | Bohn et al. |

OTHER PUBLICATIONS

International Search Report and Written Opinion, PCT/US12/53179, mailed Feb. 5, 2013, 19 pages.
Google Wallet, http://www.google.com/wallet/faq.html, Nov. 14, 2012, 6 pages.

* cited by examiner

*Primary Examiner* — Shay S Glass
(74) *Attorney, Agent, or Firm* — Choate Hall & Stewart LLP; William R. Haulbrook

(57) ABSTRACT

Described herein are apparatus and methods for collecting and manipulating transaction data. For example, presented herein is an apparatus including: a first I/O port; a second I/O port of a same type as the first I/O port, wherein the second I/O port is connected to the first I/O port such that data passed into the first I/O port is allowed to pass through the apparatus to the second I/O port unimpeded in at least a first operating mode; a processor; and a non-transitory computer readable medium storing instructions thereon wherein the instructions, when executed, cause the processor to: collect information passed from a first computing device connected to the first I/O port to a second computing device connected to the second I/O port, identify, from the information, transaction data; and provide, to a third computing device, the transaction data.

22 Claims, 17 Drawing Sheets

APPARATUS AND METHOD FOR COLLECTING AND MANIPULATING TRANSACTION DATA

RELATED APPLICATIONS

The present application claims priority to U.S. Provisional Application No. 61/529,255 entitled "Hardware Device for Collecting and Manipulating Transaction Data" and filed Aug. 31, 2011, U.S. Provisional Application No. 61/584,323 entitled "A Novel Data Manipulation System" and filed Jan. 9, 2012, and U.S. Provisional Application No. 61/584,324 entitled "Plurality of Hardware Devices for Collecting and Manipulating Transaction Data" and filed Jan. 9, 2012, the contents of each of which are hereby incorporated by reference in their entireties.

BACKGROUND

Payments for goods or services (e.g., transactions) can involve a variety of payment options such as, in some examples, cash, credit card, check, money order, and online debit account (e.g., PayPal™ by eBay Inc. of Palo Alto, Calif.). More recent payment options include a virtual wallet application provided through a mobile computing device such as a smart phone. An example of a virtual wallet is Google wallet by Google of Menlo Park, Calif. A pre-paid card, such as a service or product-specific debit card, may also be used to pay for certain transactions, such as a public transit debit card.

Collection of transactional data is an increasingly important factor in designing marketing strategies. One method involves analyzing, on a macro level, electronic purchases such as credit card purchases. For example, transactional data may be analyzed using the traditional banking system which operates through a clearing system to manage electronic transactions involving a client bank account. In another example, information collected from online commerce may be used to monitor transactions. Another option involves the purchase of specialized point of sale equipment, where the equipment manufacturer offers a service and/or system collects and provides information regarding transactions. However, in an entity involving multiple locations, potentially in geographic diverse regions and frequently under various management structures, managing an overview of transaction data collected from each of the multiple locations can prove difficult if not impossible. A further method for tracking transactional behavior involves customer loyalty programs, often requiring a customer to provide personal information at point of sale (e.g., telephone number) or requesting a loyalty card be swiped or scanned to identify the customer. The loyalty program, while beneficial in tracking a portion of the sales, provides no insight into transactions involving customers who are not members of the loyalty program or who decline to provide identifying information such as a telephone number.

SUMMARY

According to some embodiments of the present disclosure, an intermediary device is configured to be installed between a point of sale device (e.g., cash register, order entry terminal, internet merchant transaction server, etc.) and a purchase recording device (e.g., standard printer, receipt printer, facsimile, internet merchant purchase confirmation server, electronic mail server, etc.). A point of sale device, in general, refers to any computing device involved in building transaction information identifying at least product/service information and purchase quantity. A purchase recording device, in general, refers to any computing device involved in receiving transaction information prepared by a point of sale device. The intermediary device, in some implementations, is configured for hardwiring between two computing devices, such as a cash register and a receipt printer. For example, the intermediary device may include one or more cable ports (e.g., serial, parallel, universal serial bus (USB), etc.) for connecting the two computing devices via the intermediary device. In some implementations, the intermediary device is configured for wireless installation between a point of sale computing device and a purchase recording computing device. For example, the intermediary device may include one or more antennas for collecting data transmitted wirelessly (e.g., via wireless Ethernet, Bluetooth®, WiFi™, etc.) between computing devices. In other implementations, the intermediary device is configured as a software solution, for example for installation within a computing device functioning as a point of sale device or a computing device functioning as a purchase recording device.

The intermediary device, in some implementations, is configured as a pass-through device. In one operating mode of the intermediary device, information transmitted from the first computing device to a second computing device (and vice-versa) transmits across the intermediary device without obstruction or alteration. In this example, even if the intermediary device loses power, data continues to transmit between the first computing device and the second computing device. In behaving as a pass-through device, rather than an intercept and forward device, for example, the intermediary device does not impede the flow of information between the point of sale device and the purchase recording device. In other words, the intermediary device is not a possible point of failure in the communication between the point of sale device and the purchase recording device.

In one aspect, the invention is directed to an apparatus including: a first I/O port; a second I/O port of a same type as the first I/O port, wherein the second I/O port is connected to the first I/O port such that data passed into the first I/O port is allowed to pass through the apparatus to the second I/O port unimpeded in at least a first operating mode; a processor; and a non-transitory computer readable medium storing instructions thereon wherein the instructions, when executed, cause the processor to: collect information passed from a first computing device connected to the first I/O port to a second computing device connected to the second I/O port, identify, from the information, transaction data; and provide, to a third computing device, the transaction data.

In certain embodiments, the first computing device includes a point of sale terminal and the second computing device includes a purchase recording device. In certain embodiments, the apparatus further includes a third I/O port, wherein the third I/O port is configured for connection to the third computing device; and providing the transaction data includes transmitting the transaction data via the third I/O port. In certain embodiments, the apparatus further includes a communication port, wherein the communication port is configured to connect to a network communications device, and providing the transaction data includes transmitting the transaction data via the network communications device. The network communications device may include one of a modem, a router, a hub, and a gateway, for example.

In certain embodiments, the apparatus further includes an antenna, wherein providing the transaction data includes transmitting the transaction data via the antenna. In certain embodiments, a connection between the second I/O port and the first I/O port is configured to pass data through the apparatus while the apparatus is disconnected from all power sources. In certain embodiments, each of the first I/O port and the second I/O port includes a serial connector. In certain embodiments, the apparatus further includes a third I/O port and a fourth I/O port, wherein: the fourth I/O port is connected to the third I/O port such that data passed into the third I/O port is allowed to pass through the apparatus to the fourth I/O port unimpeded in at least a first operating mode, and each of the third I/O port and the fourth I/O port includes a USB connector.

In certain embodiments, in a second operating mode, the instructions cause the processor to: buffer at least a portion of the data received at the first I/O port; and forward at least a portion of the buffered data to the second computing device via the second I/O port. In certain embodiments, in the second operating mode, the instructions cause the processor to introduce injection data to the second computing device via the second I/O port prior to forwarding the at least a portion of the buffered data. In certain embodiments, buffering the portion of the data includes temporarily storing the portion of the data in a buffer region of a storage medium. In certain embodiments, the non-transitory computer readable medium includes the storage medium.

It is contemplated that combinations of the above features may be used in the apparatus.

In another aspect, the invention is directed to a method including: collecting, by an intermediary device installed between a point of sale computing device and a second computing device, information passed from the point of sale computing device to the second computing device, wherein the intermediary device is configured to collect at least a portion of the information while the information passes between the point of sale computing device and the second computing device unimpeded by the intermediary device; identifying, from the information, transaction data; and providing, to an external computing device, the transaction data.

In certain embodiments, the method further includes: identifying, from the information, printing instructions; and responsive to identifying the printing instructions, buffering the information, identifying injection information for injecting into a print stream, wherein the print stream is provided by the point of sale computing device to the second computing device, and injecting the injection information prior to transmission of a portion of the print stream to the second computing device.

In certain embodiments, the method further includes: identifying, from the transaction data, sensitive information; and prior to providing the transaction data, applying a security algorithm to the sensitive information. In certain embodiments, the sensitive information includes payment information. In certain embodiments, the security algorithm includes a strong one-way hash.

In certain embodiments, the method further includes, prior to providing the transaction data, compressing at least a portion of the transaction data. In certain embodiments, the method further includes, prior to providing the transaction data, filtering at least a portion of the transaction data. In certain embodiments, providing the transaction data includes transmitting the transaction data wirelessly. For example, at least a portion of the transaction data may be transmitted via at least one of WiFi™, WiMAX™, Bluetooth®, and Unstructured Supplementary Service Data (USSD) text message.

In certain embodiments, providing the transaction data includes providing, to a remote server via a network, the transaction data. For example, providing the transaction data may include providing at least a portion of the transaction data to a payment terminal. In certain embodiments, the payment terminal is connected to the intermediary device via a wired connection.

In certain embodiments, a payment terminal is connected to the intermediary device via a wired connection, and the method further includes receiving, from the payment terminal a print injection command. In certain embodiments, the method further includes, responsive to receiving the print injection command: identifying injection information; and injecting the injection information into a print stream, wherein the print stream is provided by the point of sale computing device to the second computing device. In certain embodiments, the injection information is received from the payment terminal.

In certain embodiments, a payment terminal is connected to the intermediary device via a wired connection, and the method further includes receiving, from the payment terminal, a print blocking command. In certain embodiments, the intermediary device is installed between the point of sale computing device and the second computing device by one of a WiFi™, Bluetooth®, and wireless Ethernet connection.

In certain embodiments, identifying the transaction data includes filtering the information to identify at least one of a product name, a product type, and a price. For example, the method may further include: analyzing the transaction data; and matching an offer based upon at least one of a threshold purchase quantity, a threshold cost, a product type, and a product name. In certain embodiments, the method further includes determining, based upon the offer, print instructions for injection to a print stream destined for the second computing device.

In another aspect, the invention is directed to a system including: a data extraction device including: a first I/O port; a second I/O port of a same type as the first I/O port, wherein the second I/O port is connected to the first I/O port such that data passed into the first I/O port is allowed to pass through the apparatus to the second I/O port unimpeded in at least a first operating mode; a communications channel configured for communication with a computing device, wherein the computing device is configured to collect transaction data extracted by the data extraction device; a processor; and a non-transitory computer readable medium storing a set of instructions that, when executed by the processor, cause the processor to: collect information passed from a first computing device connected to the first I/O port to a second computing device connected to the second I/O port; and provide at least a portion of the information to the computing device.

In another aspect, the invention is directed to a method including: receiving, at a computing device, transaction data regarding one or more transactions conducted at a point of sale; receiving, at the computing device, customer information, wherein the customer information is associated with at least a portion of the transaction data; associating, by a processor of the computing device, the transaction data with a customer loyalty program account; preparing, by the processor, based upon the transaction data, an electronic receipt; providing, by the processor, the electronic receipt to the loyalty program account; identifying, by the processor, from the transaction data; one or more purchases affiliated with a rewards program, wherein the rewards program includes at least one of an electronic punch card program and a credit rewards program; and updating, by the processor, based upon the one or more purchases, rewards information associated with the loyalty program account. In certain embodiments, providing the electronic receipt includes providing the electronic receipt for review at a customer mobile device at the point of sale responsive to completion of a first transaction of the one or more transactions. In certain embodiments, the method further includes analyzing, by the processor, the transaction data to identify one or more offers; and providing, for review at a customer mobile device, the one or more offers.

In another aspect, the invention is directed to a system including: a processor; and a non-transitory computer readable medium storing a set of instructions that, when executed by the processor, cause the processor to: identify transaction data regarding a transaction conducted at a point of sale; analyze the transaction data to identify one or more offers, wherein at least one offer of the one or more offers is associated with at least one of a product, a product type, and a cost; prepare injection information comprising at least one of the one or more offers; and provide, for injection as print data to a receipt printer by an intermediary device installed between the point of sale device and the receipt printer, the injection information. In certain embodiments, the instructions, when executed, cause the processor to: identify customer data associated with the transaction data; and identify historic transaction data associated with a customer account identified by the customer data, wherein identifying the one or more offers further includes analyzing the historic transaction data to identify at least one of the one or more offers.

In another aspect, the invention is directed to a loyalty terminal device including: an input device; an I/O port configured to communicably connect the loyalty terminal device to an intermediary device, wherein the intermediary device is configured for installation between a point of sale device and a second computing device; a communications channel configured for communication with a computing device; a processor; and a non-transitory computer readable medium storing a set of instructions that, when executed by the processor, cause the processor to: receive a customer identifier via the input device, provide the customer identifier to the computing device via the communications channel, responsive to providing the customer identifier, receive a command from the computing device, and forward the command to the intermediary device.

In certain embodiments, the command includes a print injection command. In certain embodiments, the command includes a print blocking command. In certain embodiments, the set of instructions, when executed, cause the processor to: receive, from the intermediary device, transaction data; and forward, to the computing device, the transaction data.

In certain embodiments, the loyalty terminal device further includes an antenna, wherein the communications channel includes a wireless communications channel via the antenna. In certain embodiments, the input device includes a card reader. In certain embodiments, the input device includes an optical scanning device. In certain embodiments, the loyalty terminal device further includes an antenna, wherein the set of instructions, when executed, cause the processor to provide, to a mobile device associated with the customer identifier, via the antenna, loyalty program information. The loyalty program information may include a reward redeemable towards a purchase, for example.

In another aspect, the invention is directed to a non-transitory computer readable medium, wherein the computer readable medium stores instructions that, when executed by a processor, cause the processor to: collect information passed from a point of sale computing device without impeding transmission of the information to a destination associated with the information; identify, from the information, transaction data; and provide, to an external computing device, the transaction data, wherein the destination includes a computing device comprising the processor; a printer module of the computing device receives the information; and a transaction collection and analysis module of the computing device collects the information.

In certain embodiments, the instructions, when executed, further cause the processor to: receive, from the external computing device, an injection command; responsive to identifying the injection command, buffer a print stream passed from the point of sale computing device, identify injection information for injecting into the print stream, and inject the injection information prior to transmission of a portion of the print stream to the destination.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1A:
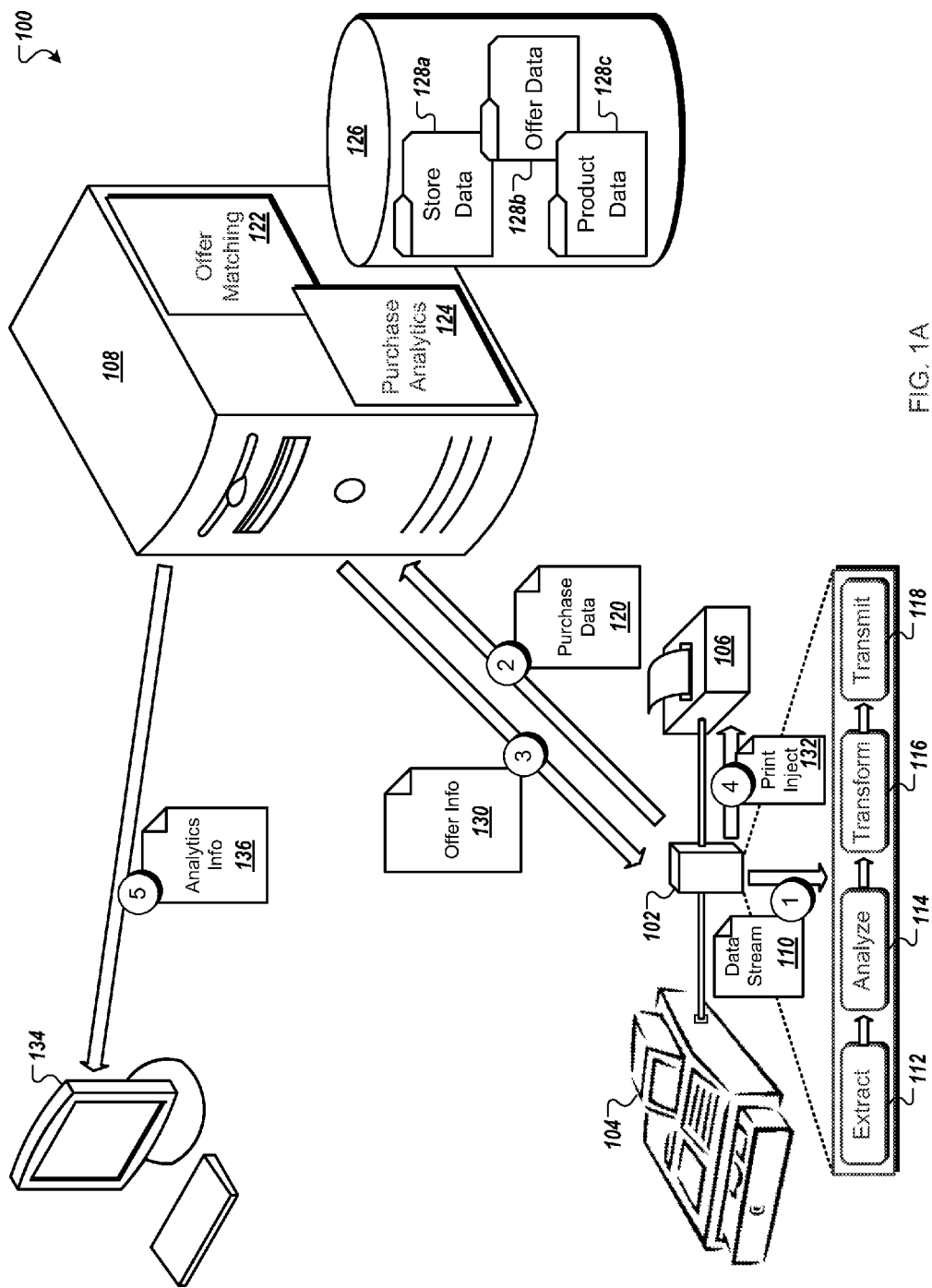
FIGS. 1A and 1B illustrate block diagrams of example systems for collecting and manipulating transaction data at point of sale.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Throughout the description, where apparatus, devices, and systems are described as having, including, or comprising specific components, or where processes and methods are described as having, including, or comprising specific steps, it is contemplated that, additionally, there are apparatus, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

According to some embodiments of the present disclosure, an intermediary device is configured to be installed between a point of sale device (e.g., cash register, order entry terminal, internet merchant transaction server, etc.) and a purchase recording device (e.g., standard printer, receipt printer, facsimile, internet merchant purchase confirmation server, electronic mail server, etc.). A point of sale device, in general, refers to any computing device involved in building transaction information identifying at least product/service information and purchase quantity. A purchase recording device, in general, refers to any computing device involved in receiving transaction information prepared by a point of sale device. The intermediary device, in some implementations, is configured for hardwiring between two computing devices, such as a cash register and a receipt printer. For example, the intermediary device may include one or more cable ports (e.g., serial, parallel, universal serial bus (USB), etc.) for connecting the two computing devices via the intermediary device. In some implementations, the intermediary device is configured for wireless installation between a point of sale computing device and a purchase recording computing device. For example, the intermediary device may include one or more antennas for collecting data transmitted wirelessly (e.g., via wireless Ethernet, Bluetooth®, WiFi™, etc.) between computing devices. In other implementations, the intermediary device is configured as a software solution, for example for installation within a computing device functioning as a point of sale device or a computing device functioning as a purchase recording device.

The intermediary device, in some implementations, is configured as a pass-through device. In one operating mode of the intermediary device, information transmitted from the first computing device to a second computing device (and vice-versa) transmits across the intermediary device without obstruction or alteration. In this example, even if the intermediary device loses power, data continues to transmit between the first computing device and the second computing device. In behaving as a pass-through device, rather than an intercept and forward device, for example, the intermediary device does not impede the flow of information between the point of sale device and the purchase recording device. In other words, the intermediary device is not a possible point of failure in the communication between the point of sale device and the purchase recording device.

Turning to FIG. 1, a block diagram of an example system 100 for collecting and manipulating transaction data at point of sale includes an intermediary device 102 installed between a point of sale (POS) terminal 104 and a receipt printer 106 (e.g., purchase recording device). The intermediary device 102 is configured to communicate transaction data to an analysis server 108.

Information shared between the point of sale device 104 and the receipt printer 106, in some implementations, is collected by the intermediary device 102. For example, the intermediary device 102 may copy a data stream 110 passing between the POS terminal 104 and the receipt printer 106. The data stream 110 may be formatted, in some examples, as a serial port data stream, parallel port data stream, or USB port data stream. In other examples, the data stream 110 may be formatted as an Ethernet data stream, WiFi™ data stream, or Bluetooth® data stream (e.g., in a solution involving a wireless connection between the point of sale terminal 104 and the receipt printer 106). Depending upon the formatting type, for example, the intermediary device 102 uses a different extraction algorithm 112 to extract information such as transaction data from the data stream 110. Various extraction algorithms 112, in some examples, may include de-packetizing, reordering, decompressing, filtering, optical character recognition (OCR), and categorizing elements within the data stream 110. For example, transaction data may be separated from device commands.

The intermediary device 102 analyzes the information, in some implementations, using one or more analysis algorithms 114. The analysis algorithms 114, in some examples, may include algorithms used to identify various categories of purchase information (e.g., product information, customer information, payment method information, terminal identification, store identification, salesperson identification, timestamp, etc.) and to recognize command information (e.g., beginning of print stream).

The analysis algorithms 114 of the intermediary device 102, in some implementations, include one or more methods for analyzing the content of the information passed from the point of sale terminal 104 to the receipt printer 106. In some examples, the intermediary device 102 may identify a product type within the product information, a balance amount, and/or a purchase quantity to determine additional information for injection as printable information to provide to the receipt printer 106. In a particular example, the intermediary device 102 may recognize a threshold dollar amount spent by the customer and inject printable information including a purchase credit for use during a later purchase.

In some implementations, the intermediary device 102 is configured with one or more transformation algorithms 116 used to transform at least a portion of the intercepted information. For example, the intermediary device 102 may recognize and encrypt transaction fulfillment information (e.g., credit card number, bank routing number, network payment service identification information, etc.). The intermediary device 102, in one example, may encrypt all collected and (optionally) analyzed data prior to providing the data to the analysis server 108. In other examples, the intermediary device 102 may include transformation algorithms 116 for compressing transaction data, filtering transaction data, recognizing textual information in a graphics format through optical character recognition (OCR), and/or packetizing transaction data for transmission to the analysis server 108.

In some implementations, the intermediary device 102 is configured to upload purchase data 120 to the analysis server 108. The purchase data 120, in some examples, may include product identifiers, product name, product price, product quantity, a terminal identifier, a cashier identifier, at least a portion of the remittance information (e.g., credit card number, etc.), one or more discounts applied to the purchase, product return information, account credit information, and a timestamp. The intermediary device 102, in some implementations, includes one or more transmission algorithms 118 for transferring transaction data to the analysis server 108. The transmission algorithms 118, in some examples, can include one or more wireless communication algorithms, one or more network-enabled communication algorithms, one or more messaging algorithms, and one or more security algorithms for transmission of transaction data. In some implementations, the intermediary device 102 transfers the purchase data 120 to the analysis server 108 at the completion of a particular transaction (e.g., upon collection of payment for a purchase, crediting of an account for a return, etc.). The purchase data 120, in some implementations, is transferred to the analysis server 108 by the intermediary device 102 periodically (e.g., every X transactions, after Y amount of data has accrued in a storage region of the intermediary device 102, after Z amount of time has passed, upon being polled by the analysis server 108, etc.).

For transmission of the purchase data 120, in some implementations, the intermediary device 102 is connected to a separate transmission device (e.g., modem, router, etc.) for transmitting collected information to the analysis server 108. The analysis server 108, in some examples, may be connected to the transmission device (not illustrated) via a local area network (LAN), wide area network (WAN), Bluetooth®, WiFi™, or internet connection. The transmission algorithms 118, for example, may include one or more connection algorithms for connecting to a separate transmission device.

In some implementations, the analysis server 108 analyzes the purchase data 120 using an offer matching engine 122 to identify one or more offers correlating to the purchase data 120. The offer matching engine 122, for example, may access a database 126 including one or more of store data 128a, offer data 128b, and product data 128c for use in identifying one or more offers matching the purchase data 120. The offer matching engine 122, for example, may correlate products in the purchase data 120 to product categories via the product data 128c. In another example, the offer matching engine 122 may identify offer data 128b related to a particular store, time of day, product name, or other information referenced within the purchase data 120 and/or derived from the purchase data 120. The offer data 128b, in some examples, may include one or more coupons, promotions, and/or rewards that are each applicable to types of information included within transactional data (e.g., product identifier, product name, product type, product category, product manufacturer, store, timestamp, etc.). In a first example, the offer matching engine 122 may identify the purchase of a package of baby diapers within the purchase data 120 and match the product to a retailer coupon for diaper wipes. In another example, the offer matching engine 122 may determine that the purchase is occurring between 6:00 a.m. and 9:00 a.m. and match a coffee kiosk promotion to the purchase data 120.

In some implementations, the analysis server 108 provides offer information 130 to the intermediary device 102 for printing to the receipt printer 106. The offer information 130, in some examples, may include one or more of an image file, text data, printer-ready formatted data, and printer instructions (e.g., positioning, formatting, alignment, watermarking, etc.). In other implementations, the offer information 130 contains an identification of an offer stored upon the intermediary device 102. The offer information 130 or the offer identified by the offer information 130 may be printed upon the transaction receipt or as a second document (e.g., coupon, etc.).

The intermediary device 102, in some implementations, is configured to monitor information passed from the POS terminal 104 to the receipt printer 106 and to inject additional data for transmission to the receipt printer 106. For example, one of the analysis algorithms 114 may be configured to recognize the beginning of print commands and to intercept the print job. The intermediary device 102, in this example, may be configured to buffer print data destined to the receipt printer 106 and to inject print injection information 132 (e.g., the offer information 130 or print instructions based upon the contents of the offer information 130) for printing by the receipt printer 106. The printer inject information 132, in some examples, may include a coupon, offer code, watermark, logo, personalized information (e.g., retailer logo, holiday greeting, etc.), or computer-readable indicia configured to provide, upon reading, an offer and/or other information.

In some implementations, the intermediary device 102 is programmed to inject particular printer inject information 132 regardless of offer information 130 being provided by the analysis server 108. For example, the intermediary device 102 may be configured to include a particular logo, watermark, computer-readable indicia, or text message upon each receipt or each of a particular type of receipt (e.g., each product return receipt, each product purchase receipt, etc.). The intermediary device 102, in some implementations, includes an offer matching algorithm. For example, rather than or in addition to the offer matching engine 122 of the analysis server 108, the intermediary device 102 may perform matching based upon transaction data. For example, the intermediary device 102 may be programmed to print a rewards certificate for each purchase over $50.00.

Two or more intermediary devices, in some implementations, feed collected information into the analysis server 108. For example, a separate intermediary device may be installed at each point of sale terminal within a single physical location (e.g., store, etc.) or at a number of point of sales terminals at a number of locations (e.g., store branches, franchise outlets, etc.). The analysis server 108, further to this example, may be configured to collect and analyze information collected from all of the two or more intermediary devices installed by a particular entity (e.g., retailer, agency, corporation, etc.).

In some implementations, a purchase analytics engine 124 provides statistical analysis and reporting of purchase behavior. For example, the analysis server 108 may collect information provided by one or more intermediary devices, store the information within the database 126, and query the collected information in view of additional database information (e.g., product information, customer information, store information, etc.) to derive business insight. The statistical analysis, in some implementations, is provided by an analytics product or service. For example, the collected data may be imported to an analytics tool such as Google Analytics by Google, Inc. of Menlo, Park or a retail management system (RMS) such as Microsoft Dynamics RMS by Microsoft Corp. of Redmond, Wash. The system 100, in some implementations, includes a customized retail transaction analytics system. For example, the system may include a tool for reviewing transactional data, customer data, store data, and other information through a report-based analytics software tool designed to function with data collected by intermediary devices such as the intermediary device 102. A user at a terminal 134 (e.g., browser, monitor attached to the analysis server 108, handheld computing device, desktop computing device, or other computing device capable of presenting graphical analysis information) may review analytics information 136 provided by the analysis server 108 and/or derived from information obtained by the analysis server 108.

While the transaction data collected by the system 100, in various implementations, is configured for use in deriving analytics information on many levels such as, in some examples, a product level, a store level, a POS-terminal level, a timeframe level, and a promotion level, the system 100 does not include a method for tracking behaviors at an individual customer level. Turning to FIG. 1B, a second example system 150 combines features of the system 100 with an enhanced intermediary device 152 in communication with a loyalty terminal 154 configured to collect customer information 156. Customer information 156, when available (e.g., when a customer is a member of a loyalty rewards program or otherwise offers unique identifying information such as a telephone number), is collected prior to completion of a transaction such that customer information may be associated with the transaction data (e.g., purchase data 120 as collected by the enhanced intermediary device, similar to the collection process described in relation to FIG. 1A). The customer information 156, in some examples, may be received by the loyalty terminal 154 by swiping a loyalty card 158 in a card reader portion of the loyalty terminal 154, entering a customer identification number such as a telephone number into a keypad portion of the loyalty terminal 154, or receiving a wireless transmission (e.g., Bluetooth®, near field communication (NFC), radio-frequency identification (RFID), etc.) containing the customer information 156 from an application executing upon a mobile device 160.

In some implementations, the loyalty terminal 154 receives the purchase data 120a from the enhanced intermediary device 152. The loyalty terminal 154, for example, may provide the purchase data 120a within a threshold time period (e.g., five minutes, ten minutes, etc.) from providing the customer information 156 to the analysis server 108. For example, based upon relative timestamps of the transmission of the customer information 156 and the purchase data 120a, the analysis server 108 may identify which customer information correlates to which transaction. In other examples, the loyalty terminal 154 appends the customer information 156 to the purchase data 120a prior to providing the purchase data 120b to the analysis server 108.

In other implementations (not illustrated), the loyalty terminal 154 and the enhanced intermediary device 152 transmit the customer information 156 and the purchase data 120a separately. For example, the loyalty terminal 154 may allocate a unique identifier associated with the transaction to the enhanced intermediary device 152, and the enhanced intermediary device 152 may append the unique identifier to the purchase data 120 prior to providing the purchase data 120 to the analysis server 108. In this circumstance, the analysis server 108 can associate the customer information 156 with the purchase data 120 based upon a matching unique identifier. In another example, based in part upon a relative time stamp of each of the customer information 156 and the purchase data 120a, and based further in part upon unique identifiers associated with both the loyalty terminal 154 and the enhanced intermediary device 152, the analysis server 108 can associate particular customer information 156 with particular purchase data 120.

Using the combination of the customer information 156 and the purchase data 120, the offer matching engine 122 of the analysis server 108, in some implementations, accesses historic transaction data associated with the customer identified by the customer information 156 to be used in analysis of the purchase data 120. For example, the offer matching engine 122 may combine present purchase data 120 with historic purchase data in determining a credit, reward, or offer to provide to the customer. In a particular example, the offer matching engine 122 may combine a current purchase of two burritos with historic purchase data identifying the purchase of eight burritos to identify that a free burrito credit should be rewarded to the customer (e.g., in a buy ten get one free offer program). The offer matching engine 122, further to the example, could provide injection data (not illustrated), including a free burrito credit, to the enhanced intermediary device 152 for injection within a print stream destined to the receipt printer 106 (e.g., similar to the process described in FIG. 1A in relation to the injection data 132). In another example, the offer matching engine 122 may identify customer mailing information from customer data records 128d within the database 126 and initiate the mailing of a reward or offer to the customer's address.

In some implementations, the offer matching engine 122 provides offer information 162 to an electronic account (e.g., mobile account accessible via a mobile device application, online account accessible via an Internet browser, etc.) associated with the customer identified within the customer information 156. For example, the customer can execute a mobile application or visit a loyalty program web site to review offers provided in relation to a loyalty program managed by the analysis server 108.

In some implementations, a user of the mobile device 160 may download and install a mobile device application configured to provide offers and promotions from one or more retailers. For example, the mobile device application may function as a loyalty rewards program (e.g., in addition to or in lieu of the loyalty rewards card 158). For example, the mobile device application may provide customer information 156a (e.g., via a wireless transmission from the mobile device 160) at the loyalty terminal 154.

In some implementations, information collected from one or more intermediary devices is used to match offers for a customer. For example, based upon purchase history at a particular store, across a number of store locations, and/or at a variety of retail outlets (e.g., retailers owned by a same entity), the analysis server may identify one or more offers to provide to a particular customer.

The loyalty rewards program user interface (e.g., mobile application, browser application, etc.), in some implementations, is configured to maintain two or more loyalty rewards program within the same electronic account. For example, the user may download a same mobile device application for participation in a coffee shop loyalty rewards program and a car wash loyalty rewards program.

In some implementations, the loyalty program electronic account receives electronic receipt data 168 transmitted by the analysis server 108. For example, an electronic receipt generation engine 164 of the analysis server 108 may generate the electronic receipt 168 based upon the purchase data 120 provided by the enhanced intermediary device 152. The electronic receipt 168, in some implementations, may be issued to the mobile computing device 160 via a mobile device messaging system. In other implementations, the electronic receipt 168 may be received by a mobile device application or browser-based application (e.g., as part of the loyalty rewards program).

In some implementations, rather than receiving both the electronic receipt 168 and a paper receipt, the enhanced intermediary device 152 is configured to block the print data from transmission to the receipt printer 106. For example, based upon a command issued by the electronic receipt engine 164 of the analysis server 108, the enhanced intermediary device 152 may intercept print instructions from the POS terminal 104 destined for the receipt printer 106. In some implementations, a customer may opt for electronic-only receipts via an electronic account configuration option. For example, within user preferences, the customer may select electronic receipt only. The electronic receipt engine 164, when preparing the electronic receipt 168, may access customer data 128d associated with the customer information 156 and determine that the customer does not wish to receive a printed receipt. The electronic receipt engine 164 may issue a command to the enhanced intermediary device 152 to block the printing of the paper receipt at the receipt printer 106. In some implementations, the command is relayed to the enhanced intermediary device 152 through the loyalty terminal 154. In other implementations, the command is provided directly to the enhanced intermediary device 152 (e.g., through a wired or wireless connection between the analysis server 108 and the enhanced intermediary device 152).

The purchase analytics engine 124, through the use of the loyalty terminal 154, has the ability to track analytics at the customer level. For example, the customer data 128*d*, in some implementations, includes demographic information such as, in some examples, region (e.g., based upon address, portion of address, area code, and/or region of stores frequented by customer), age information (e.g., age, age range, date of birth, etc.), family information (e.g., number of children, ages of children, spouse, pets, etc.), and income level. At least a portion of the demographic information, in some implementations, is collected in part when signing the customer up for the loyalty program electronic account or upon installation of the loyalty program mobile application. In some implementations, a portion of the demographic information is derived from purchase habits (e.g., a monthly dog food purchase is indicative of one or more pets, etc.). This information may be used, for example, to present enhanced analytics information 166 to a user at the terminal 134. In some implementations, the information may be analyzed using the Recency Frequency Monetary Value (RFM) method for analyzing customer behavior based upon transactional information.

Although the intermediary device 102 and the enhanced intermediary device 154 are illustrated as being positioned between the point of sale terminal 104 and the receipt printer 106, in other implementations, the intermediary device 102 and/or the enhanced intermediary device 154 may be implemented as software services installed upon one or both of the point of sale terminal 104 and the receipt printer 106. For example, a software application for collecting and analyzing transaction information may be installed upon the receipt printer 106.

Although the intermediary device 102 and the enhanced intermediary device 152 are illustrated as being hardwired between the point of sale terminal 102 and the receipt printer 106, in other implementations, the intermediary device 102 and/or the enhanced intermediary device 152 may be configured to collect wireless communications between the point of sale terminal 104 and the receipt printer 106, for example using an Ethernet, WiFi™, or Bluetooth® connection. Similarly, the enhanced intermediary device 152, in some implementations, may be configured to communicate wirelessly with the loyalty terminal 154.

Figure 1B:
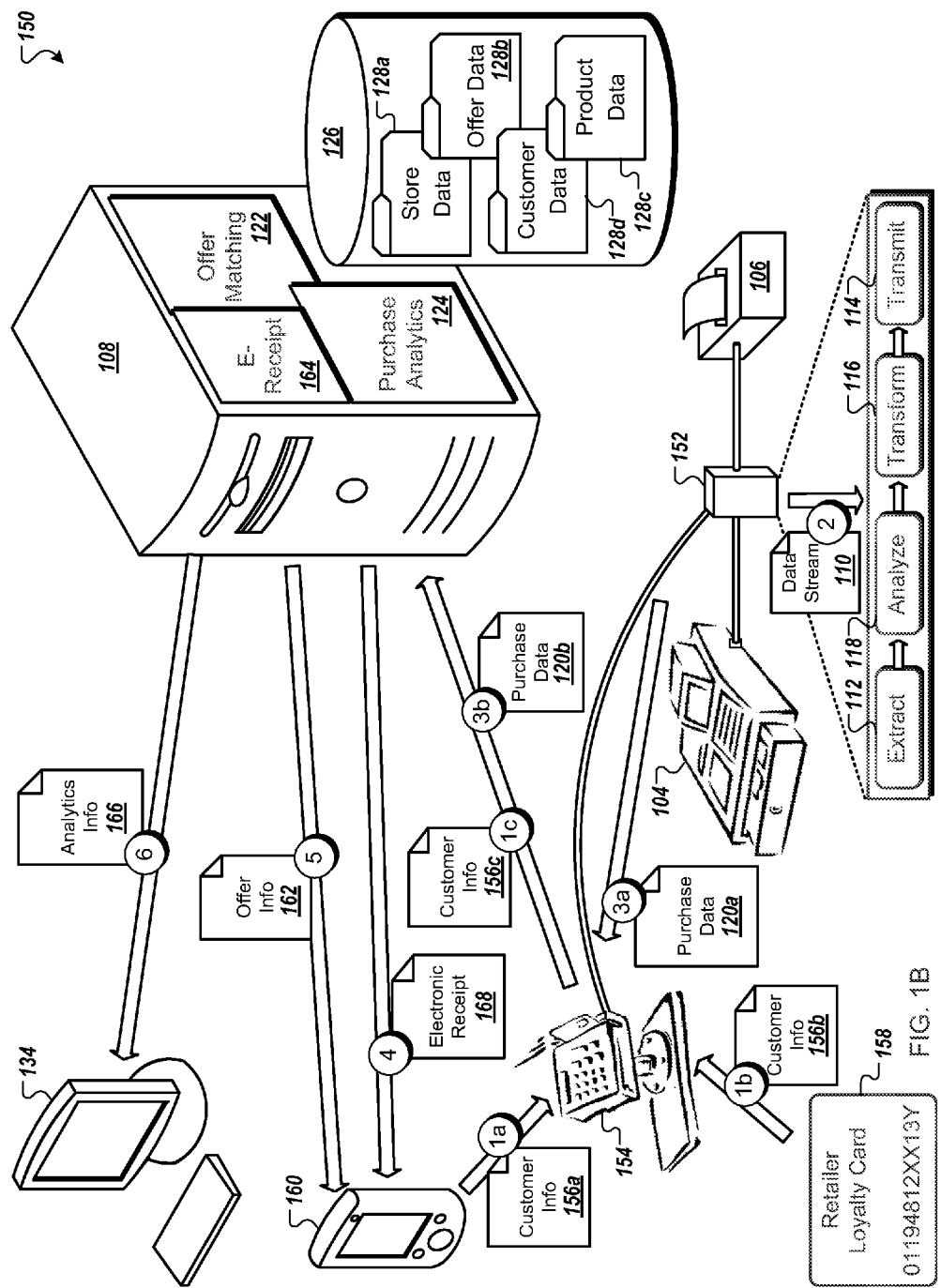
Figure 2A:
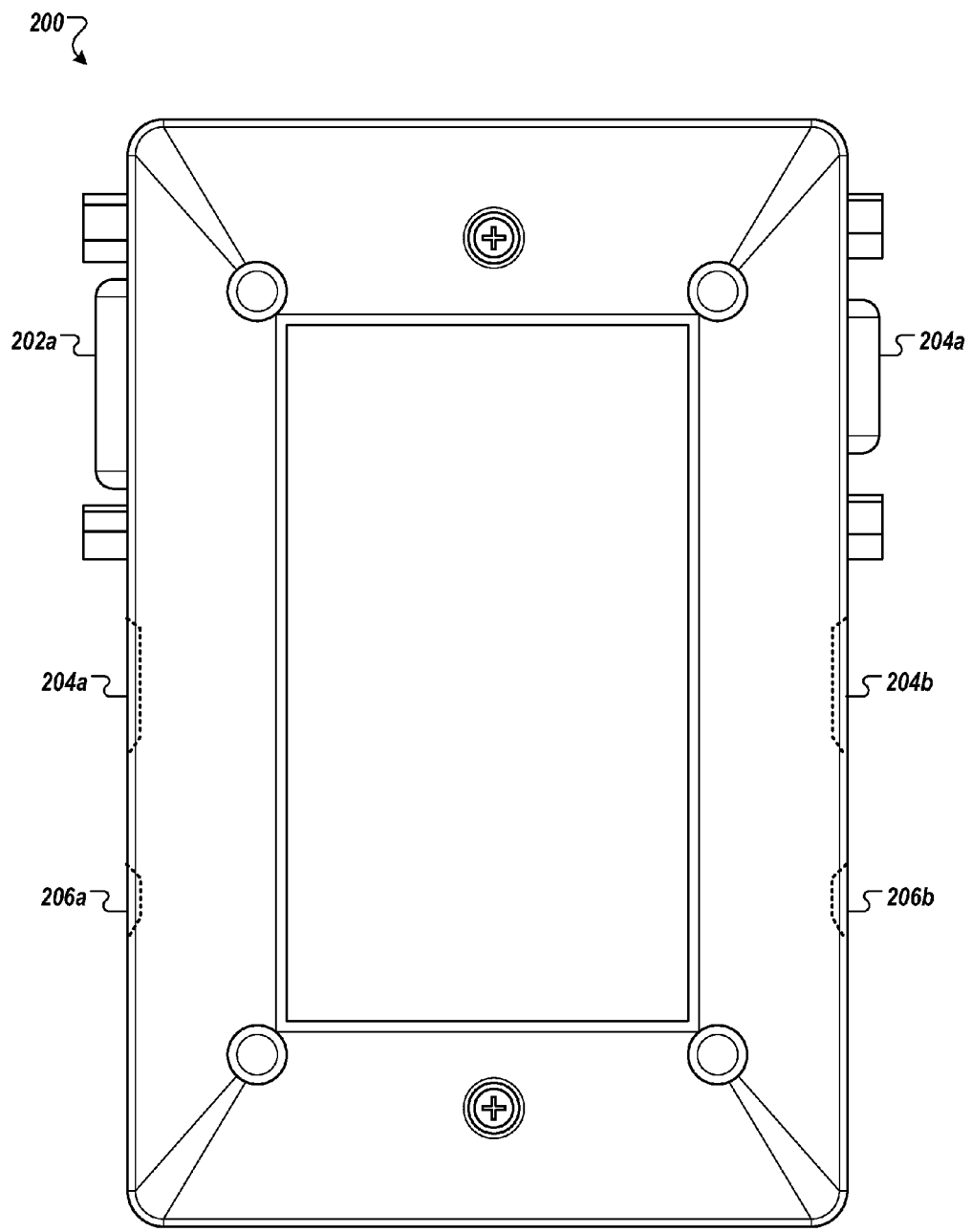
FIGS. 2A through 2C are block diagrams of example hardware configurations for a device for collecting and manipulating transaction data at point of sale.
Figure 2B:
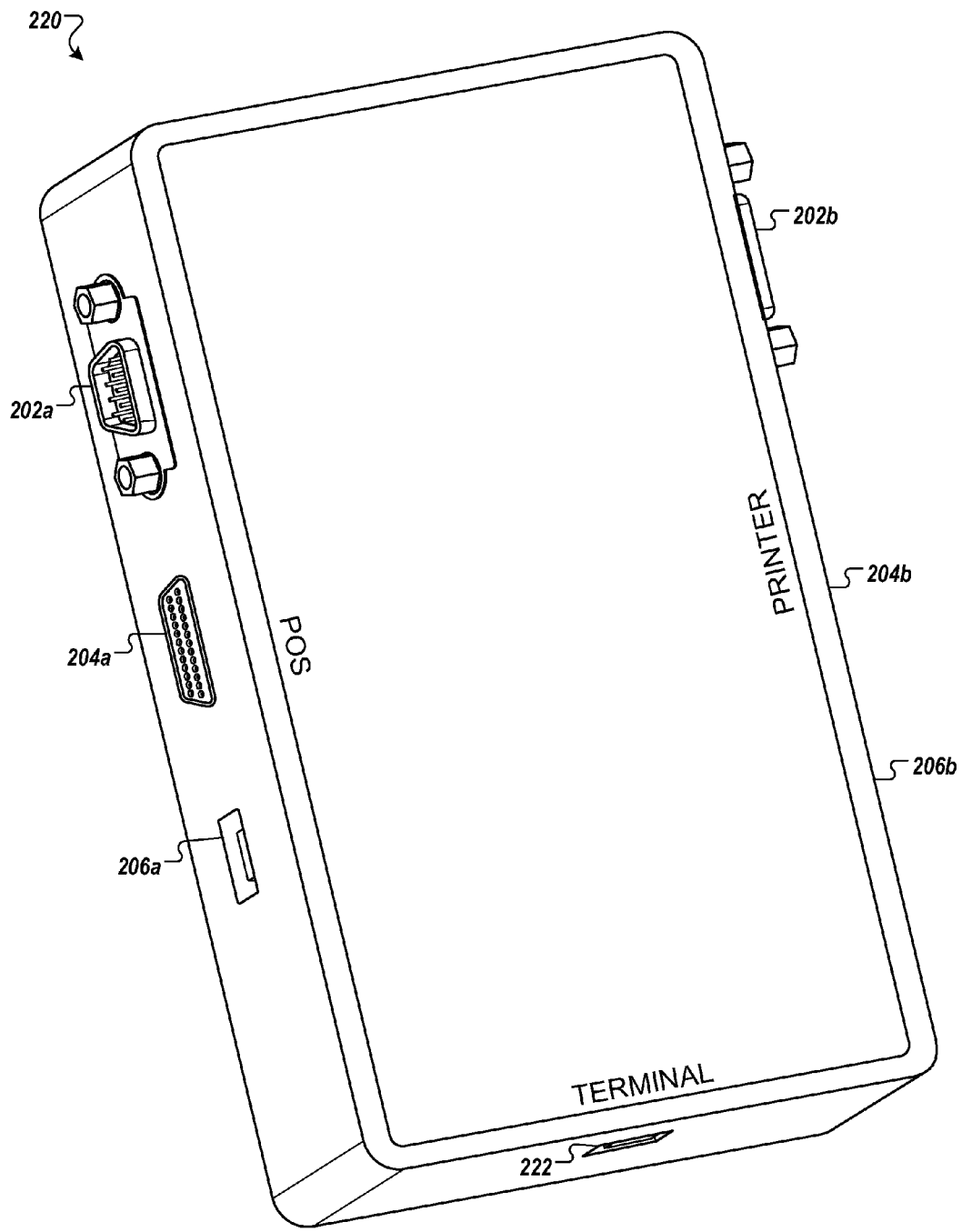
Figure 2C:
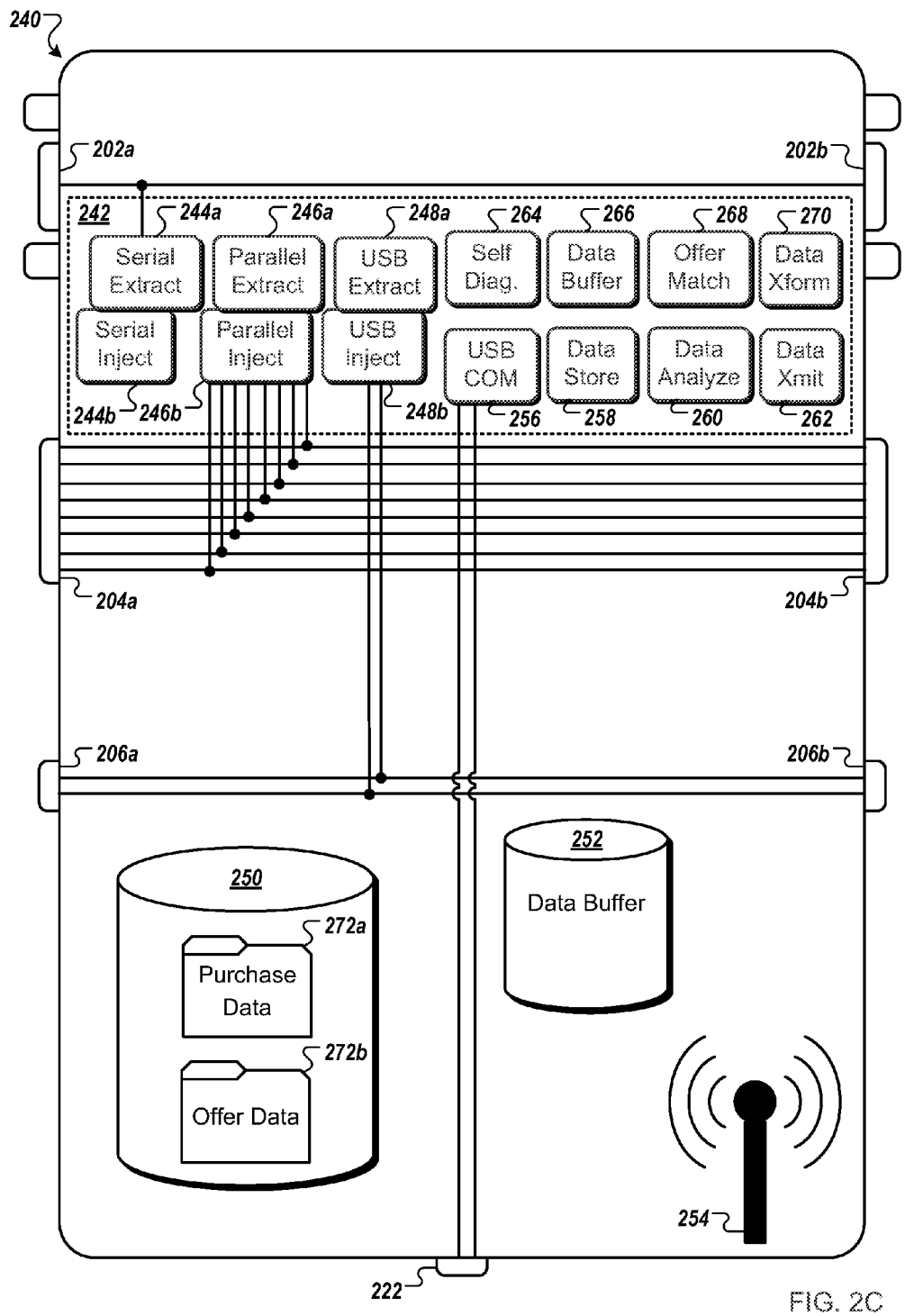

FIGS. 2A through 2C are block diagrams of example hardware configurations for a device for collecting and manipulating transaction data at point of sale. The illustrated hardware configurations, for example, include configurations which may be suitable for functionality as the intermediary device 102 as described in relation to FIG. 1A or the enhanced intermediary device 152 as described in relation to FIG. 1B.

Turning to FIG. 2A, a device 200 includes a set of serial ports 202 (e.g., DE-9, DIN-8, RS-232, UART, D-type, D-subminiature, RS-422, Mini-DIN, 8P8C, 10P10C, DH10, etc.), a set of parallel ports 204 (e.g., SCSI-1, SCSI-2, SCSI-3, SCSI-5, DB-25, DC-37, DD-50, CN-50, HDCN60, Wide SCSI, Very High Density Cable Interconnect (VHDCI), etc.), and a set of USB ports 206 (e.g., USB standard 1.1, 2.0, or 3.0, Type A or Type B, Mini-A or Mini-B, Micro-USB, etc). The device 200, in some implementations, is connected to a first serial port compliant device at the serial port 202*a* and to a second serial port compliant device at the serial port 202*b*. The device 200, in this configuration, is configured to permit communication of data issued by the first serial port compliant device to the second serial port compliant device through the connection to the serial ports 202. The device 200, in other implementations, is configured to enable communication between a first parallel port compliant device and a second parallel port compliant device through connection to the parallel ports 204. Similarly, the device 200, in further implementations, is configured to enable communication between a first USB compliant device to a second USB compliant device through connection to the USB ports 206. Although illustrated in relation to the example serial, parallel, and USB ports, in other implementations, the device 200 may include one or more sets any style of port commonly used in connecting point of sale computing devices to purchase recording computing devices such as, in some examples, an ISDN connector, an Ethernet connector, a registered jack (RJ) (e.g., RJ11, RJ14, RJ21, RJ45, RJ48, etc.), or a Personal System/2 (PS/2) connector.

In some implementations, the device 200 derives power through the connection of the external devices. For example, the device 200 may derive power off of the USB connection between a first USB compliant device connected to the first USB port 206*a* and a second USB compliant device connected to the second USB port 206*b*. In other implementations, the device 200 includes a separate power supply such as, in some examples, an internal battery, or a wire and plug connectable to a power socket supply. In further implementations, the device 200 is connected to a separate piece of equipment, such as a docking station, that is in communication with a power supply.

The device 200, in some implementations, is configured to pass data between devices connected one of the sets of ports 202, 204, 206 even in the event of loss of power to the device 200. For example, should a battery of the device 200 lose power or a plug connection to an external power supply become disconnected, data will continue to transfer between a set of ports 202, 204, or 206 providing communication between connected computing devices.

The device 200, in some implementations, includes a separate connection for transferring information collected from the data passed between one of the sets of ports 202, 204, 206. For example, the device 200 may include a wireless transmitter for transferring information to a separate computing device over a wireless communication path (e.g., WiFi™, WiMAX™, Bluetooth®, Unstructured Supplementary Service Data (USSD) text message, wireless Ethernet, etc.). The device 200, in some implementations, may collect wireless communications between a point of sale computing device and a purchase recording computing device using a wireless transmitter.

In some implementations, the device 200 includes a port (not illustrated) for connecting with a communication device, such as a router or modem. For example, the device 200 may include a modem port, an Ethernet port, a mini-USB connector, or another connection to a communication device for communication of transaction data via a network such as, in some examples, a LAN, WAN, Intranet, Internet, cellular, GSM, or other network.

In some implementations, a device for collecting and manipulating transaction data at point of sale is configured for connection to an additional computing device, such as the server 108 described in relation to FIGS. 1A and 1B or the loyalty terminal 154 described in relation to FIG. 1B. Turning to FIG. 2B, a device 220 includes the set of serial ports 202, the set of parallel ports 204, and the set of USB ports 206. Additionally, the device 220 includes a USB port 222 for connection to a loyalty terminal device.

The USB port 222, in some implementations, is used to connect a user computing device to the device 220 for configuration and/or troubleshooting purposes. For example, a user may connect a personal computing device to the USB port 222 to configure one or more offers for an offer matching algorithm of the device 220. In another example, a user may upload injection information such as logos, images, greetings, watermark overlays, and other graphical or textual components that the device 220 can inject for printing to a printing device connected to one of the ports 202*b*, 204*b*, 206*b*. A user, in a further example, may retrieve statistics regarding the device 220, install a software update to the device 220, or review historic status and error messages accumulated by the device 220 while collecting, analyzing, and transmitting transaction data.

In some implementations, the USB port 222 is connected to a loyalty terminal, such as the loyalty terminal 154 described in relation to FIG. 1B. The device 220, in some examples, can receive power (e.g., off of the USB line connecting the device 220 to the loyalty terminal), commands, and/or communication access (e.g., network access) via the loyalty terminal. For example, the loyalty terminal may forward transaction data provided by the device 220 to a separate computer for analysis purposes (e.g., the analysis server 108 described in relation to FIG. 1B). An example of a loyalty terminal configured for connection to the device 220 via the USB port 222 is described in greater detail in relation to FIG. 3.

Turning to FIG. 2C, a block diagram of an example internal configuration of a device 240 for collecting and manipulating transaction data at point of sale is illustrated. The device 240 includes the set of serial ports 202, the set of parallel ports 204, and the set of USB ports 206, as well as the USB port 222. Within the device 240, a microprocessor 242 includes a series of modules for collecting, analyzing, transforming, and transmitting transaction data communicated between a first computing device connected to one of the ports 202*a*, 204*a*, and 206*a* and a second computing device connected to the matching port 202*b*, 204*b*, 206*b* of a connected pair of ports 202, 204, 206. As illustrated, each set of ports 202, 204, 206 is directly connected via one or more data lines (e.g., depending upon the style of port). For example, the serial ports 202*a*, 202*b* are connected via a single data line for the serial passing of data, while the parallel ports 204*a*, 204*b* are connected via a set of eight data lines for parallel passing of data.

In other implementations, the parallel ports 204*a*, 204*b* are implemented using Universal Asynchronous Receivers (UARTs) (not illustrated). For example, a first UART 204*a* may reduce a parallel data stream to a serial form for ease of data collection, while a second UART 204*b* may produce a parallel data stream from the serial form for receipt by a connected printing device. In some examples, an RS-232, RS-422, or RS-485 UART pair may be used to translate parallel communications to serial and back for data collection and injection purposes.

In a full hardware configuration, other lines would be connected between sets of ports such as, in some examples, ground, voltage, control signal lines, and other lines typically connected to one or more of the ports 202, 204, 206 to enable their functionality. Although not illustrated, the microprocessor 242 collects information from one or more additional lines, in some implementations, to monitor the communication stream between a point of sale computing device and a purchase recording computing device. For example, the microprocessor may collect control communication from a control line configured between a set of ports 202, 204, 206. For simplification, however, only data lines from which the microprocessor 242 is configured to collect data are illustrated.

The microprocessor 242 includes extraction modules 244*a*, 246*a*, and 248*a* for extracting data off of the one or more data lines connecting sets of ports 202, 204, 206. For example, a serial extraction module 244*a* is configured to extract data being transmitted across the serial data line between the set of serial ports 202. The extraction modules 244*a*, 246*a*, and 248*a*, in some implementations, are configured to extract a data stream between two ports 202, 204, 206, recognize a formatting of the data (e.g., based upon the type of port), and extract transaction data from the formatting (e.g., depacketize, reorder, etc.). In a first mode of operation, in some implementations, the extraction modules 244*a*, 246*a*, and 248*a* are configured to extract data while allowing the data transmission to continue unimpeded. For example, the extraction modules 244*a*, 246*a*, and 248*a*, when in pass-through mode, may copy information while it passes between a point of sale computing device to a second computing device and vice-versa. The copying operation, for example, occurs in real time and without obstruction to or alteration of the information. In this manner, for example, the intermediary device 240 may collect transaction data without posing the threat of being a point of failure in the transactional operations.

In some implementations, the extraction modules 244*a*, 246*a*, and 248*a* are additionally configured to delay or block the transmission of a portion of the data being passed between the respective set of ports 202, 204, 206. For example, a parallel extraction module 246*a* may temporarily store a portion of the data within a data buffer 252 portion of a storage media of the device 240. The delay or blockage of transmission, in some implementations, may be enabled via an external command. For example, a USB communication module 256 may receive a command from a separate computing device connected to the USB port 222. Responsive to the command, the USB communication module 256 may provide a signal for the device 240 to begin buffering or blocking the transmission of data. In some implementations, prior to buffering and/or blocking data, the active extraction module 244*a*, 246*a*, or 248*a* may watch for and recognize the beginning of a particular type of data stream between the respective ports 202, 204, or 206. For example, a USB extraction module 248*a* may recognize a print command destined for the USB port 206*b* and begin to buffer or block print stream data destined to the device connected to USB port 206*b*. By functioning as a pass-through device unless buffering and/or blocking print stream data, for example, the device 220 may collect transaction data without impeding communication between the two connected devices. The pass-through mode, for example, allows collection of transaction data without the possibility of the intermediary device 220 becoming a point of failure (e.g., because data continues to flow between the respective ports 202, 204, and 206 unchanged and unimpeded by the extraction modules 244*a*, 246*a*, and 248*a*).

In some implementations, buffering of the data stream between a respective set of ports 202, 204, or 206 may be achieved through a data buffering module 266. The data buffering module 266, for example, may intercept an incoming data stream (e.g., received through one of the ports 202*a*, 204*a*, or 206*a*, temporarily buffer the information to the data buffer 252 portion of the storage media. Further to the example, the data buffering module may provide, at a later time, portions of the buffered data stream to a respective injection module 244*b*, 246*b*, and 248*b* for injection to the respective port 202*b*, 204*b*, or 206*b*.

In some implementations, in addition to extraction of data, one or more injection modules 244*b*, 246*b*, and 248*b* may be configured to inject data onto one or more data lines connecting a respective set of ports 202, 204, 206. For example, a USB injection module 248*b* may inject data onto the USB data lines to be delivered to a device connected to the USB port 206b. In some implementations, the injection modules 244b, 246b, and 248b may be configured to "spoof" the device connected to the sending port 202a, 204a, or 206a. For example, for instructions injected upon the parallel lines connected to parallel port 204b, a parallel injection module 246b may manipulate a data header to mimic data being sent by the device connected to the parallel port 204a. In some implementations, spoofing includes altering header information in buffered data. For example, to inject information in the middle of a USB print stream, print data destined out the USB port 206b after the point of injection may have modified header information to maintain a recognizable sequence of data packets received by a device connected to the USB port 206b. In some implementations, spoofing includes altering and/or adding control messages passed between the point of sale computing device and the purchase recording computing device.

In some implementations, data for injection via one of the injection modules 244b, 246b, and 248b is received from an external device. For example, as described in relation to FIG. 1A, offer information may be provided by an external computing device (e.g., the analysis server 108) and received by the device 240 (e.g., over the USB port 222 or an antenna 254). Injection data, in some implementations, is determined by the device 240. For example, an offer matching module 268 may match information contained within transaction data extracted by one of the extraction modules 244a, 246a, 248a and provide one or more matching offers (e.g., as identified from offer records 272b stored within a data store 250) to the correlating injection module 244b, 246b, 248b for presentation at a computing device connected to the selected port 202b, 204b, 206b. For example, offer information may be printed to a receipt by a receipt printer connected to port 204b by injecting offer information into a print stream using the parallel injection module 246b.

Prior to matching an offer, in some implementations, data extracted by one of the extraction modules 244a, 246a, 248a may be analyzed by a data analysis module 260. The data analysis module 260, for example, may recognize portions of transaction data, such as product names, quantities, and prices. The data analysis module 260, in some implementations, categorizes transaction data by portions of a record (e.g., payment instrument information versus product purchase listing versus remittance information, etc.). In some implementations, the data analysis module 260 provides the identified elements of the transaction data to a data storage module 258 for storage within one or more purchase records 272a of the data storage medium 250. The data storage module 258, in some implementations, associates transaction data in a database form within the storage media 250. The transaction data, in some implementations, is stored in a format that is later retrievable by identification of a unique transaction. For example, each transaction may be uniquely identified by the combination of a timestamp and POS terminal identifier.

In some implementations, the device 240 transmits transaction data stored within the data storage medium 250 to an external computing device. A data transmission module 262, for example, may be used to transmit data via the USB communications module 256 or the antenna 254. In some examples, data may be transmitted on a per-transaction basis, periodically, upon request by an external device (e.g., a command received by the USB communications module 256), or at the point when the data storage medium 250 is reaching a threshold capacity.

Prior to transmitting the data via the data transmission module 262, in some implementations, a data transformation module 270 transforms the transaction data for transmission. For example, the data transformation module 270 may encrypt, compress, filter, and/or packetize transaction data prior to transmission. In some implementations, one or more transformation techniques may be applied to the transaction data prior to storage within the data store 250. For example, upon identification of payment instrument information, such as credit card information, the data transformation module 270 may apply a security algorithm, such as a strong one-way hash, to the payment instrument information prior to storage and/or transmission of the transaction data. In some implementations, the security algorithm is compliant with the Payment Card Industry Data Security Standard (PCI DSS).

In some implementations, the device 240 includes a self diagnostic module 264 for collecting statistical information regarding the performance of the device 240, providing external debugging of the device 240, and/or providing access to one or more configuration parameters of the device 240. For example, a user may connect a computing device to the device 240 via the USB port 222 to access configuration, diagnostics and/or statistics information related to the device 240. The connected computing device, for example, may be installed with a program configured to communicate with the self diagnostic module 264. The self diagnostic module 264, in some examples, includes telemetric information such as a unique identifier of the device 240, a state (e.g., on, off, passive collection, active injection, active blocking, etc.), an up time (e.g., length of time since last power cycle and/or timestamp of last power cycle), a version number of the device 240 and/or a software installation of the device 240, an amount of data collected, an amount of data transmitted, an amount of data injected, timestamps associated with the most recent data collection/transmission/injection, an identification of a loyalty terminal communicating with the device 240, one or more errors reported by the device 240, and a data storage capacity of the device 240 (e.g., quantity of data stored, disk space available, etc.).

In some implementations, a user program designed to interface with the self diagnostic module 264 includes an offer module for configuring the offer matching module 268 with parameters for matching and serving offers. The offer module, for example, may provide the user with a method for adding offers to the offer records 272b.

In some implementations, two or more intermediary devices such as the device 240 are configured to share information. For example, a master intermediary device may receive configuration parameters through a user program interface, and the master intermediary device may share the configuration parameters (e.g., offer records 272b, network connection parameters, etc.) with one or more slave intermediary devices. The slave intermediary devices, in some implementations, include a simpler configuration than the master intermediary devices. For example, a slave intermediary device may lack a component for communication with the user program. Further to this example, the master intermediary device may receive and store telemetric information provided by one or more slave intermediary devices. In another example, a slave intermediary device may lack the data analysis module 260. For example, data may be collected by one or more slave intermediary devices, then transmitted to the master intermediary device for analysis. Other implementations of capability-sharing between master and slave intermediary devices are possible.

Although described in relation to collecting transaction data shared between two wired devices connected via one of the sets of ports 202, 204, 206, in other implementations, the device 240 is configured to extract transaction data communicated wirelessly between a point of sale computing device and a purchase recording computing device. For example, additional modules may include a wireless Ethernet extraction module, a WiFi™ extraction module, and/or a Bluetooth® extraction module. Additionally, in other implementations, injection modules may be provided for injecting information into a wireless communication stream between a point of sale computing device and a purchase recording computing device.

Figure 3:
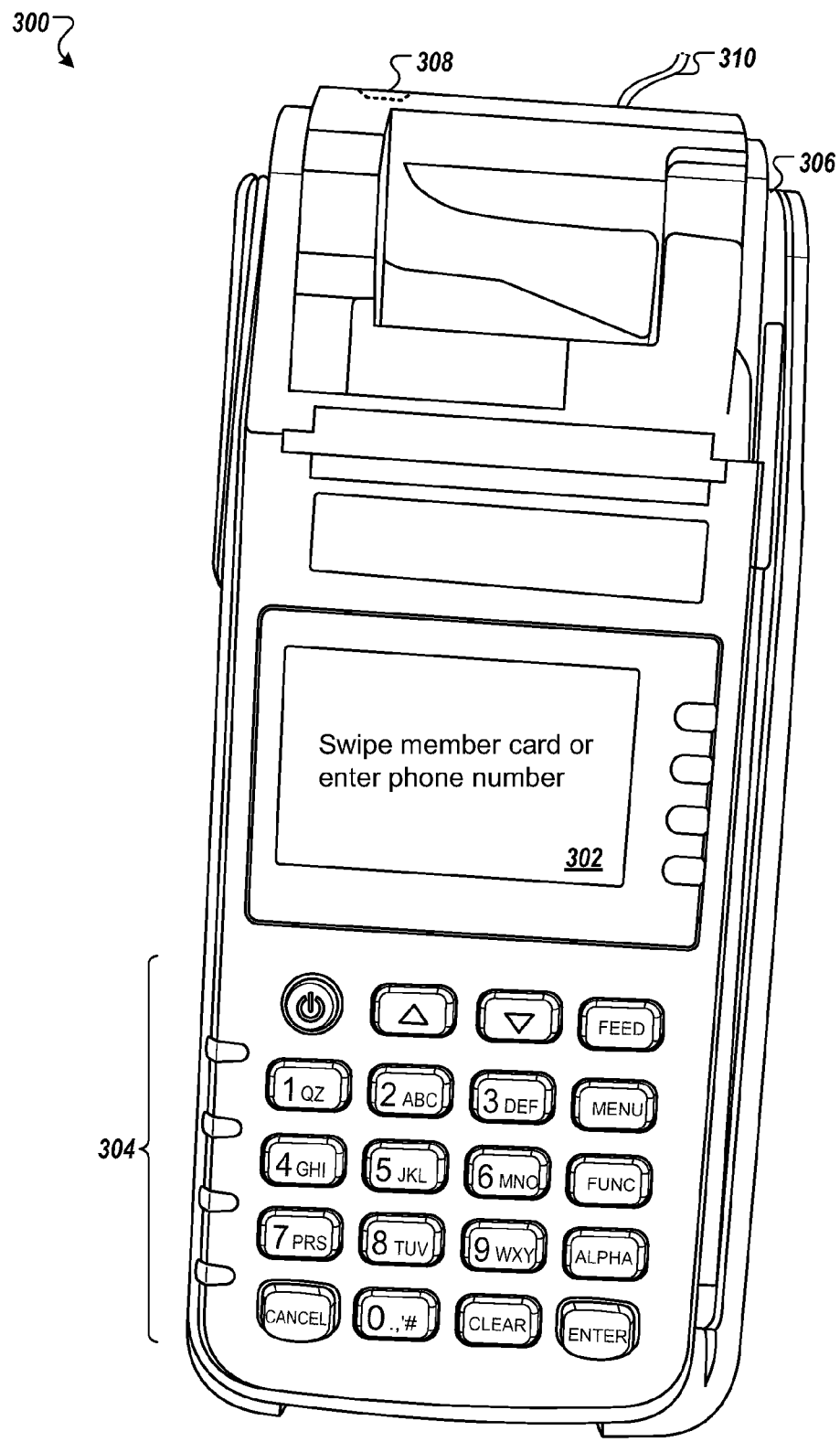
FIG. 3 is a block diagram of an example hardware configuration of a device for collecting and communicating customer information at point of sale.

FIG. 3 is a block diagram of an example hardware configuration for a loyalty terminal 300 for collecting and communicating customer information at point of sale, such as the loyalty terminal 154 described in relation to FIG. 1B. The loyalty terminal 300 includes a display region 302 inviting a user to "Swipe member card or enter phone number." The member card or phone number, for example, may be used to derive customer information, as described in relation to FIG. 1B (e.g., mobile device 160 providing customer information 156a, loyalty card 158 providing customer information 156b). The phone number, for example, may be entered using a keypad 304, while the member card may be swiped through a swipe trough 306. In other implementations, rather than swiping a card, the card may be read using a near field communication (NFC), Bluetooth®, or other short distance wireless communication method. For example, a loyalty card may be implanted with a short range communication device such as an RFID chip. In further implementations, machine-readable indicia on the loyalty card may be read using an optical scanning functionality of the loyalty terminal 300. For example, upon presenting the loyalty card to the display region 302, an optical scanner may scan information displayed upon the loyalty card. In some implementations, a mobile application executing upon a smart phone device may transmit a telephone number to the loyalty terminal 154 through a wireless transmission such as NFC and Bluetooth®.

The loyalty terminal 300, in some implementations, is connected to an intermediary device such as the device 220 described in relation to FIG. 2B to enable association between transaction data collected by the intermediary device and the customer information collected by the loyalty terminal 300. In some implementations, the loyalty terminal 300 includes a communication port (e.g., a modem port, an Ethernet port, a mini-USB connector, or another connection to a communication device) for communication of customer identification data and, optionally, transaction data via a network such as, in some examples, a LAN, WAN, Intranet, Internet, cellular, GSM, or other network.

In some implementations, the loyalty terminal 300 includes an antenna and built-in communications module for communicating information via a network. In some examples, the loyalty terminal 300 may be configured to communicate customer information and, optionally, transaction data via wireless transmission (e.g., WiFi™, WiMAX™, Bluetooth®, Unstructured Supplementary Service Data (USSD) text message, wireless Ethernet, etc.). In other implementations, the loyalty terminal includes a network port for connecting directly (e.g., via an Ethernet cable, etc.) or indirectly (e.g., via a modem or other communication device) to a communications network.

The loyalty terminal 300, in some implementations, includes a USB port 308 for connection to the device 220. For example, the loyalty terminal 300 may act as a power source and communication feed for the device 220. For power, in some implementations, the loyalty terminal 300 includes a power connector (e.g., outlet plug, etc.) 310. In other implementations, the loyalty terminal may be battery operated or derive power through connection to a separate device, for example via a USB connection to a point of sale terminal or computing device.

In some implementations, the loyalty terminal 300 collects information for adding a new customer to a loyalty program and transmits the customer information to a separate computing device. For example, the loyalty terminal 300 may present a series of questions to a new customer such as, in some examples, name, mailing address, telephone number, and email address of a new customer. In response to establishing a new customer account, in some implementations, the loyalty terminal 300 may present instructions for installing a loyalty rewards program mobile application. For example, the loyalty terminal 300 may present information within the display area 302 including machine-readable indicia for retrieving the uniform resource locator (URL) or other network address information to download an installation program. For example, an optical scanner function of the mobile device of the user may be used to scan machine-readable indicia (e.g., bar code, QR code, etc.) presented within the display area 302 of the loyalty terminal 300. In some implementations, the separate computing device may provide instructions for opening an electronic account with the loyalty rewards program through a browser application or for installing the loyalty rewards program mobile application. For example, the separate computing device may send an email to a provided email address containing the URL for accessing a browser application or downloading the mobile application installation program.

In some implementations, the loyalty terminal 300 may present user options regarding the current transaction. For example, the loyalty terminal 300 may present, within the display region 302, the option of having an electronic receipt provided to the customer in addition to or in lieu of a paper receipt. In some implementations, responsive selection by the customer of the option to only receive an electronic receipt, the loyalty terminal 300 issues a command to the device 200 to block print instructions from reaching an attached printing device.

Although described in relation to messages displayed within a display region, in some implementations, the loyalty terminal 300 includes a voice response program for speaking instructions to a customer and receiving natural language responses related to customer identification and transaction options.

Figure 4A:
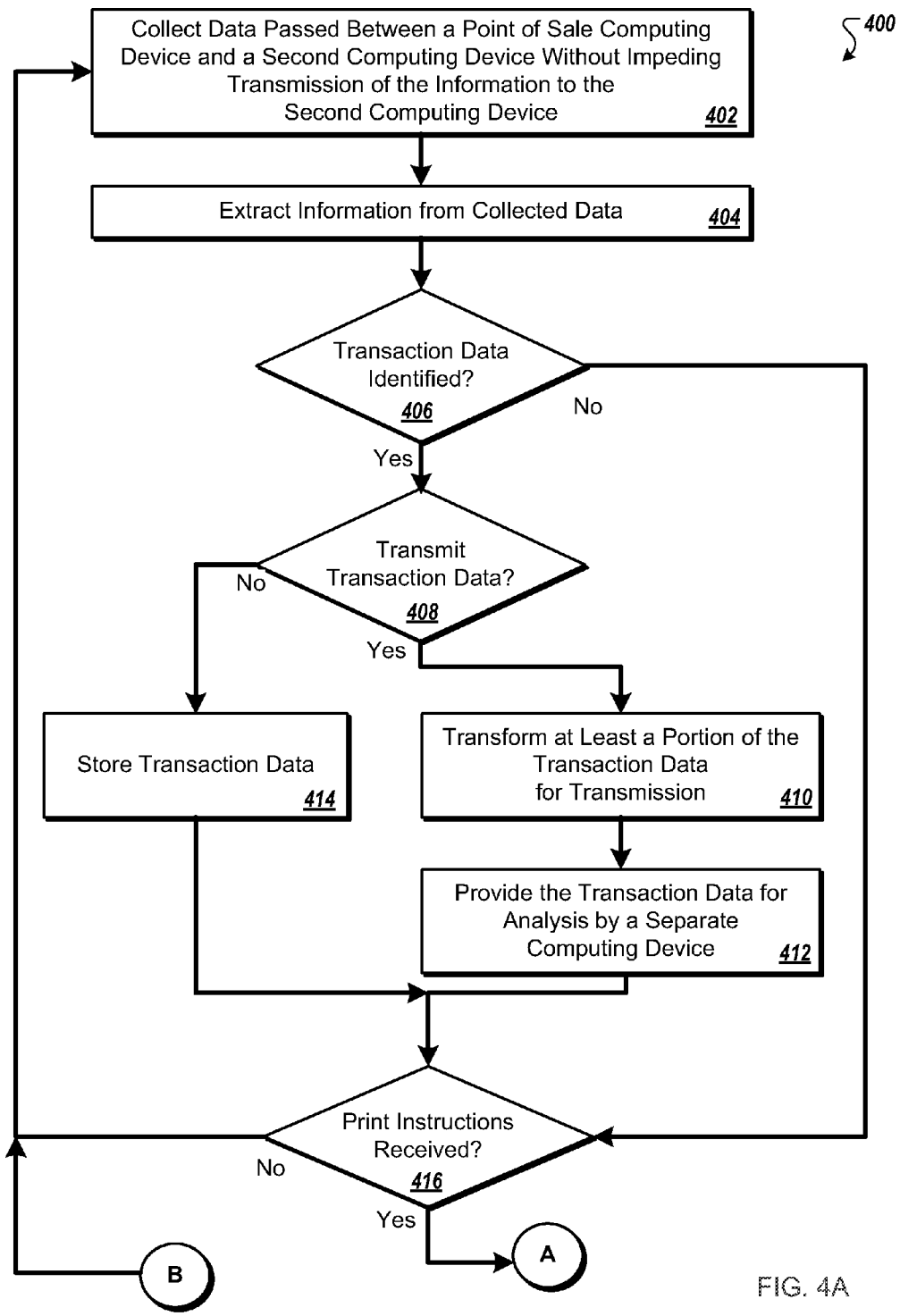
FIGS. 4A and 4B illustrate a flow chart of an example method for extracting, transforming, and transmitting transaction data at point of sale.
Figure 4B:
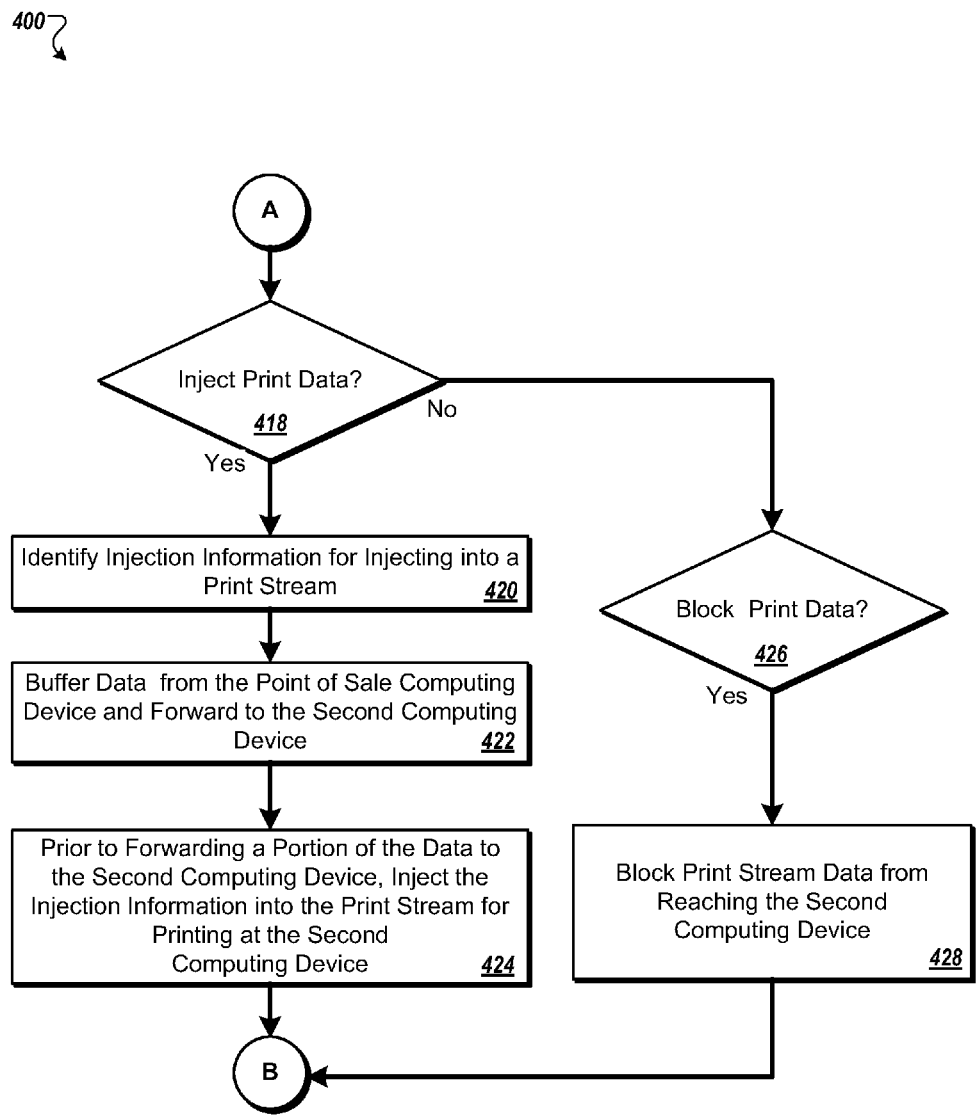

FIGS. 4A and 4B illustrate a flow chart of an example method 400 for extracting, transforming, and transmitting data in a device for collecting and manipulating transaction data at point of sale. Portions of the method 400 can be executed by an intermediary device such as the intermediary device 102 described in relation to FIG. 1A or the enhanced intermediary device 152 described in relation to FIG. 1B.

In some implementations, the method 400 begins with collecting data passed between a point of sale computing device and a second computing device (402). The data is collected, in some modes, without impeding transmission of the data between the point of sale computing device and the second computing device.

In some implementations, information is extracted from the collected data (404). For example, information may be depacketized, reordered, and otherwise identified from within a collected data stream. Extraction of the information, for example, may be implemented by one of the extraction modules 244a, 246a, 248a as described in relation to FIG. 2C.

If transaction data is identified (406), and the transaction data is scheduled to be transmitted (408), in some implementations, at least a portion of the transaction data is transformed for transmission (410). Transaction data may be identified, for example, by the data analysis module 260 as described in relation to FIG. 2C. In some examples, the transaction data may be categorized into one or more types of information (e.g., purchase data, remittance data, discount data, etc.), encrypted, compressed, filtered, and/or packetized prior to transmission. One or more of the data transformations, for example, may be applied by the data transformation module 270 as described in relation to FIG. 2C.

In some implementations, the transaction data may be provided for analysis by a separate computing device (412). The separate computing device, for example, may include the analysis server 108 as described in relation to FIGS. 1A and 1B. The transaction data may be provided across a wired or wireless connection to the separate computing device. In some implementations, the transaction data may be supplied to the separate computing device over an antenna, such as the antenna 254 described in relation to FIG. 2C. In other implementations, the transaction data may be provided via the USB port 222 by the USB communications module 256, as described in relation to FIG. 2C.

If, instead, the transaction data is not to be immediately transmitted (408), in some implementations, the transaction data may be stored (414). For example, the data storage module 258 may store the transaction data within the data storage medium 250 (e.g., as purchase data records 272a) as described in relation to FIG. 2C. In some implementations, a portion of the transaction data may be transformed prior to storage. For example, transaction records may be compressed, filtered, and/or encrypted prior to storage by the transformation module 270.

Whether or not transaction data was identified (406), in some implementations, the method 400 may continue by determining whether print instructions were received (416). If print instructions have been received (416), in some implementations, the method 400 continues in FIG. 4B with determining whether there is print data to be injected (418).

If print data is to be injected (418), in some implementations, injection information may be identified for injecting into a print stream (420). The injection information, in some examples, may include an offer, rebate, greeting, watermark, logo, or other information for printing upon a receipt, purchase agreement, return slip, or other communication commonly printed by a POS terminal. In some implementations, the injection information is determined by the offer matching module 268, described in relation to FIG. 2C. For example, the offer matching module 268 may match one or more offer records 272b to transaction data identified by the data analysis module 260. In some implementations, the injection information is received from an external computing device, such as the analysis server 108 described in relation to FIGS. 1A and 1B. For example, the injection information may be received via the USB communication module 256 over the USB port 222 or via the wireless antenna 254.

In some implementations, data provided by the point of sale computing device for the second computing device may be buffered prior to forwarding to the second computing device (422). For example, rather than functioning in pass through mode where data is extracted without impeding communication between the point of sale computing device and the second computing device, the device may enter a second mode where data is buffered prior to being delivered to the second computing device. In some implementations, the data buffering module 266, described in relation to FIG. 2C, may buffer the data extracted by one of the extraction modules 244a, 246a, 248a.

In some implementations, prior to forwarding a portion of the data to the second computing device, injection information is injected into the print stream for printing at the second computing device (424). In some implementations, one of the injection modules 244b, 246b, 248b injects the injection information into the data being supplied to the second computing device. Injecting information into the print stream, in some implementations, may involves transforming the information to allow it to be recognized by the second computing device as print information. For example, the injection information may be packetized, ordered, or formatted in a manner to match the buffered data stream. In some implementations, transformation of the injection information includes adding header information to spoof the injected information as having been supplied by the point of sale computing device. The transformation of the injection information, in some implementations, may be accomplished by the data transformation module 270.

In some implementations, in addition to transforming the injection information, at least a portion of the buffered print stream is transformed prior to forwarding to the second computing device. For example, to maintain frame order, a frame identifier within subsequent frames may be incremented to take into consideration additional frames injected into the print stream.

Additionally, to maintain control communication between the point of sale device and the second computing device, in some implementations, one or more control frames are transformed or spoofed. For example, print acknowledgment control data may be modified (e.g., to reduce size of print job to the original print instructions provided by the point of sale device) and/or discarded (e.g., discard control data confirming printing of material never sent by the point of sale).

In some implementations, rather than injecting print data (418), the method 400 receives a command to block data from being printed (426). For example, as described in relation to FIG. 1B, a user receiving the electronic receipt 168 may wish to suppress the printing of a paper receipt by the receipt printer 106. In some implementations, a print suppression command is issued by the analysis terminal to either the intermediary device or the loyalty terminal (which then forwards the command to the intermediary device). A print suppression option, in some implementations, is entered at the loyalty terminal by a customer. The loyalty terminal, in this case, may forward the command to the intermediary device.

In some implementations, print stream data is blocked from reaching the second computing device (428). For example, the enhanced intermediary device 152 may be configured to block a portion of the data stream 110 from reaching the receipt printer 106 to suppress the printing of the receipt. In some implementations, data may be blocked from being printed by the data buffer module 266 operating in a no-forwarding mode.

Although the method 400 has been described in relation to a series of steps performed in an example order, in other implementations, one or more of the steps of the method 400 may be performed in a different order and/or in parallel, and one or more steps may be added to the method 400. Furthermore, one or more of the steps of the method 400, in other implementations, may be combined or removed. In one example, transaction data may be extracted from print stream information while the print stream information is being blocked or buffered. When transmitting transaction data (408), in some implementations, previously stored transaction data may be accessed and combined with present transaction data for transmission to a separate computing device (412). In some implementations, in coordination with blocking the print stream data, the method 400 may spoof an acknowledgement of success of printing to supply to the point of sale computing device, such that the point of sale computing device does not attempt to re-send print instructions, (e.g., under the assumption of prior failure). Other modifications of the method 400 are possible without straying from the intent and purpose of the method 400.

Figure 5A:
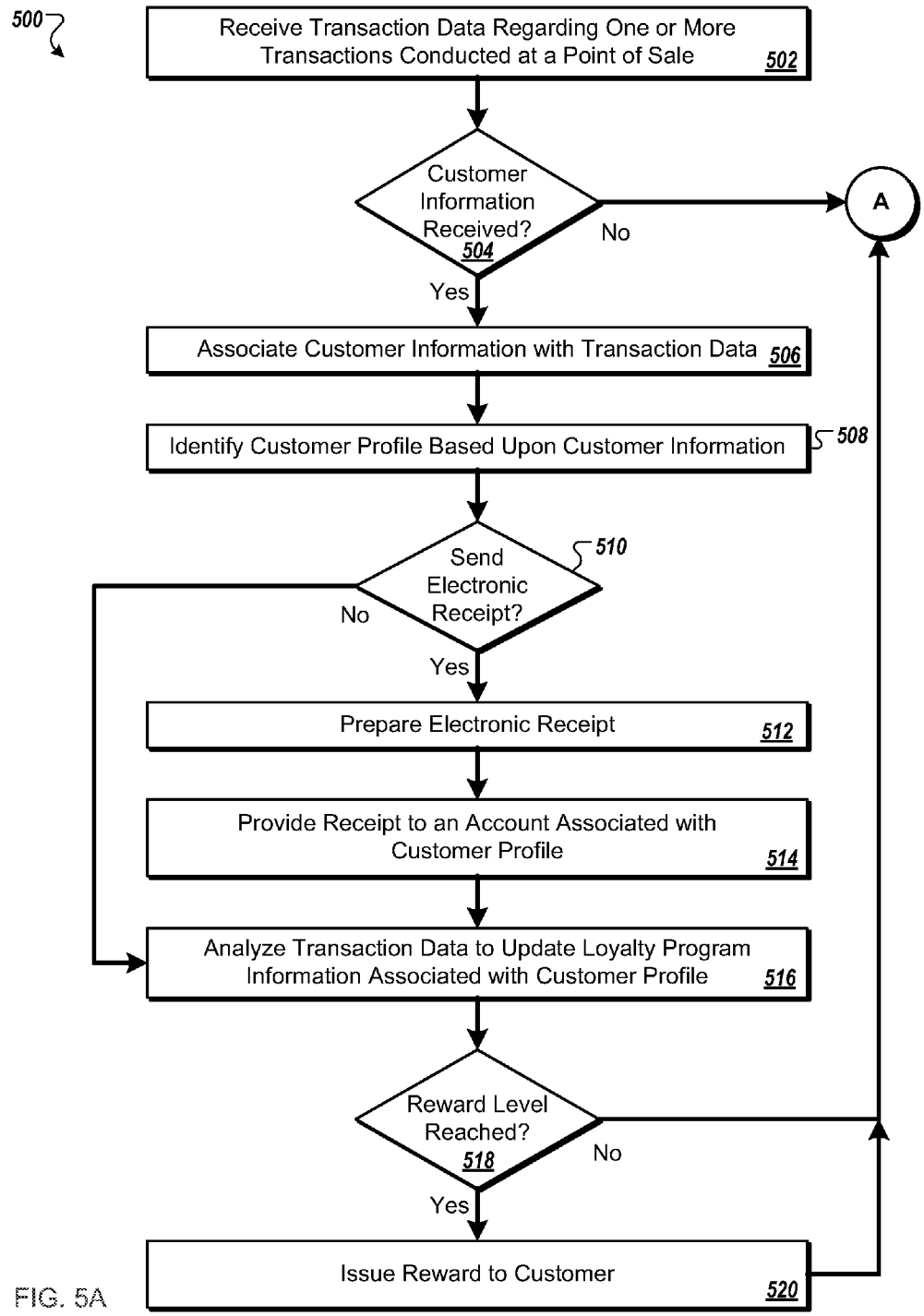
FIGS. 5A and 5B illustrate a flow chart of an example method for analyzing data and matching offers in a system for collecting and manipulating transaction data at point of sale.
Figure 5B:
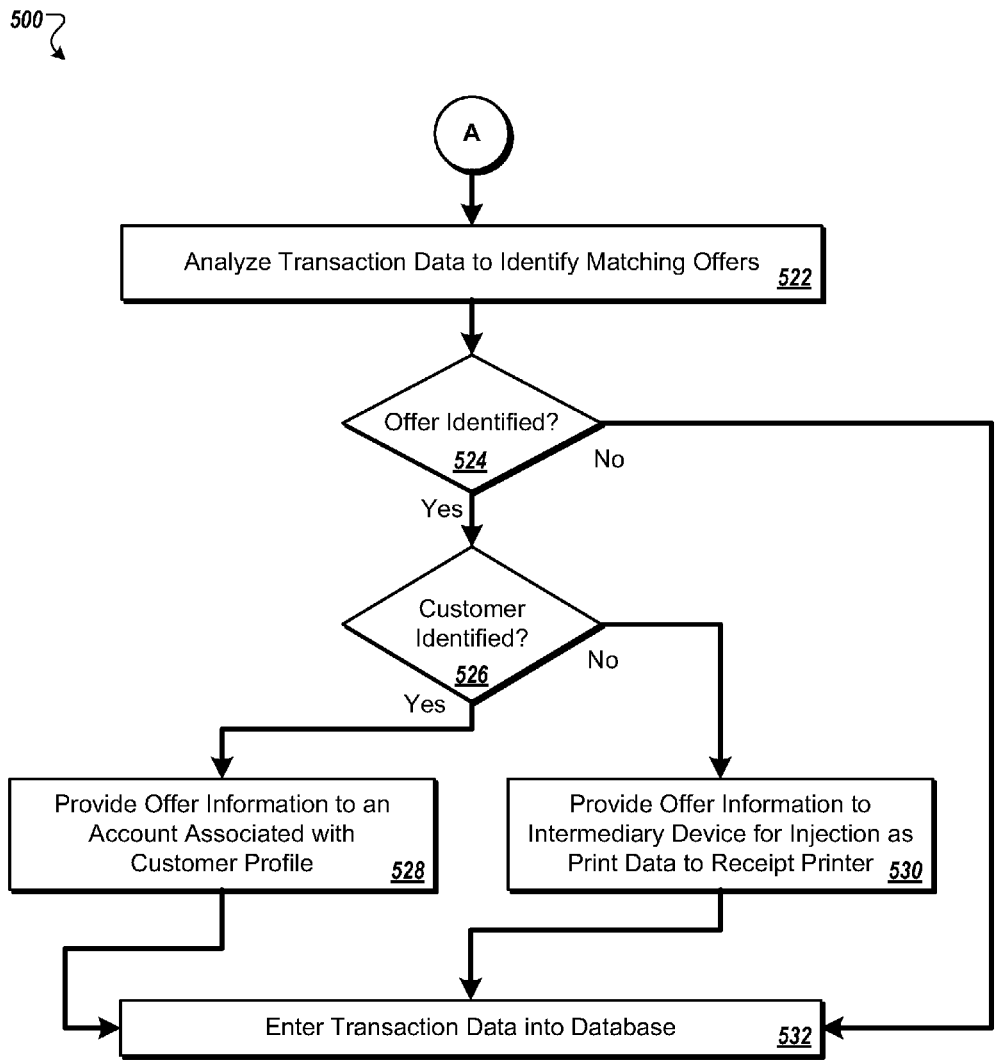

FIGS. 5A and 5B illustrate a flow chart of an example method 500 for analyzing data and matching offers in a system for collecting and manipulating transaction data at point of sale. The method 500 may be performed on transaction data collected by the intermediary device 102 or enhanced intermediary device 152, as described in relation to FIGS. 1A and 1B. The method 500, in some implementations, is performed by the analysis server 108, described in relation to FIGS. 1A and 1B.

In some implementations, the method 500 begins with receiving transaction data regarding one or more transactions conducted at a point of sale computing device (502). The transaction data, for example, may have been collected by an intermediary device installed between a point of sale computing device and a second computing device.

In some implementations, if customer information is received (504), the customer information is associated with the transaction data (506). For example, a unique identifier, such as a telephone number, loyalty card identification, combination of username and password, biometric information, or other uniquely identifying information may be provided within customer information. If this is a new customer, in some implementations, the customer information may include registration information (e.g., name, address, telephone number, etc.). In the example of a new customer, in some implementations, a unique identifier may be associated with the customer information.

In some implementations, the customer information is received within a same transmission as the transaction data. For example, the customer information may be associated with a same communication stream provided to a separate computing device. In other implementations, the customer information is provided separately from the transaction data. The transaction data and the customer information, for example, may be associated with a particular identifier, such as a temporary unique identifier. The customer information (e.g., unique customer identifier), in this example, is associated with the transaction data through the linking of the two sets of information by the temporary unique identifier. In some implementations, the transaction data is associated with the customer information via storage within a database containing both customer records and transaction records.

In some implementations, based upon the customer information, a customer profile is identified (508). For example, information such as, in some examples, customer biographic data, preferences, options, and transaction history may be collected within a customer profile. The customer profile, for example, may be identified by linking the customer identifier to records within a customer database.

Based upon the customer profile, it is determined whether to send an electronic receipt to the customer (510). In some implementations, a customer selects, within preferences, whether to receive electronic receipts. In some implementations, an electronic receipt may be generated based upon information related to the customer identifier (e.g., existence of an email address, phone number for text messaging, identification of an electronic account of a loyalty rewards program, identification of a social networking account, or existence of another method for communicating electronic receipt information to the customer). For example, customers who use a physical loyalty card may not have provided adequate information to receive electronic receipts.

If an electronic receipt is being sent (510), in some implementations, an electronic receipt may be prepared (512). For example, the transaction data may be parsed to identify and format an electronic receipt identifying the purchase of one or more items and/or the return of one or more items.

In some implementations, the electronic receipt is provided to an account associated with the customer profile (514). The account, in some implementations, includes an email address. For example, an electronic receipt may be emailed to a customer. In some implementations, the account includes an electronic account with an online (e.g., browser-based) loyalty rewards program. In some implementations, the account includes a mobile application account. For example, using a loyalty program application, the customer may be provided a tool for organizing and reviewing electronic receipts related to a number of transactions. In some implementations, the loyalty program application is affiliated with a particular retailer or corporate entity. In other implementations, the loyalty program application is a third party application capable of presenting information related to the loyalty programs of one or more retailers. The retailers, for example, may sign up with the third party for management of the loyalty program including providing electronic receipts to customers.

Whether or not an electronic receipt is issued, in some implementations, the transaction data is analyzed to update loyalty program information associated with the customer profile (516). For example, the transaction data may be analyzed in light of historic transaction data to identify a threshold purchase (e.g., threshold amount of money spent, threshold number of a particular product purchased, threshold number of times purchasing a particular service, etc.). In a particular example, the transaction data may be compared to historic data to determine whether eight rounds of golf have been purchased, in which case a reward for a free bag of balls may be applied to the customer account.

If a reward level has been reached (518), in some implementations, a reward is issued to the customer (520). In some implementations, if electronic contact information such as, in some examples, an email address, social networking account, loyalty rewards program electronic account, or text message-enabled telephone number is provided, the reward is issued to the customer electronically. For example, an electronic coupon or certificate may be allocated within the loyalty rewards program electronic account of the customer. In another example, a loyalty rewards card associated with the customer account may be credited with the reward. The customer, additionally, in some implementations, may be emailed or text messaged with an alert related to the application of the reward to the loyalty rewards program electronic account or the loyalty card. The reward, in some implementations, may be issued physically. For example, the customer may be mailed a paper coupon or a rewards program card with a reward applied to the balance. In some implementations, the method for issuing the reward may be based in part upon customer preferences. For example, by reviewing the customer profile, it may be determined that the customer prefers to be mailed a physical rewards certificate.

Turning to FIG. 5B, regardless of whether customer information was received (504) or a reward level was reached (518), in some implementations, the transaction data may be analyzed to identify matching offers (522). In the circumstance that a customer has not been identified, the products, purchase quantity, and/or purchase amount may be analyzed to identify one or more offers to associate with the transaction. For example, based upon identifying that a particular brand of yogurt has been purchased, an offer for a discount towards a frozen yogurt product may be identified. In the circumstance that a customer has been identified, in some implementations, historic transaction data may be reviewed in light of the current transaction data when identifying an offer. For example, if a customer has historically purchased a pedicure one or more times, and the current transaction data does not identify a pedicure, an offer for a discount on a pedicure may be identified.

If an offer has been identified (524), and customer information has been identified (526), in some implementations, the offer information may be provided to an account associated with the customer profile (528). For example, an offer for a discount pedicure may be emailed to the customer, applied to an electronic account of a loyalty program associated with the customer, text messaged to the customer, or mailed to a home address of the customer.

If an offer has been identified (524) but no customer has been identified associated with the transaction data (526), in some implementations, the offer information is provided to an intermediary device for injection as print data to a receipt printer (530). As discussed in relation to FIG. 1A, for example, an intermediary device, installed between a point of sale computing device and a printing device, may identify print stream information and inject additional print instructions related to printing the offer. In some implementations, the offer is printed on the receipt supplied to the customer. The offer, in some implementations, is presented on an additional slip of paper.

Regardless of the various decisions made throughout the method 500, in some implementations, the transaction data is entered into a database (532). The database, for example, may be queried in relation to analytics software for presenting statistical analysis to a retailer, corporation, or entity regarding historical transactions. In another example, a loyalty rewards program mobile application or browser application may query the database to obtain historical data regarding the transactions of a particular individual, in relation to a particular entity (e.g., retailer, corporation, etc.) or in relation to a number of entities.

Although the method 500 has been described in relation to a series of steps performed in an example order, in other implementations, one or more of the steps of the method 500 may be performed in a different order and/or in parallel, and one or more steps may be added to the method 500. Furthermore, one or more of the steps of the method 400, in other implementations, may be combined or removed. In one example, transaction data may be entered into a database (532) prior to preparing the electronic receipt (512). In another example, the transaction data may not be analyzed to identify matching offers (522) or, if a customer has been identified, the analysis for offers may be done in combination with the analysis for identifying rewards (516). In some implementations, rather than providing offer information to the intermediary device for injection as print data to a receipt printer (530), offer information may be provided to a loyalty terminal such as the loyalty terminal 154 described in relation to FIG. 1B. For example, the loyalty terminal could present a QR code to the customer within a display region of the loyalty terminal (e.g., such as the display region 302 as illustrated in FIG. 3). Using the mobile device, the customer could scan the QR code to obtain the offer. Similarly, in some implementations, the customer may be presented with reward information at the loyalty terminal. For example, within a display region of the loyalty terminal, reward information may be presented. A customer, for example, may be prompted to swipe a loyalty rewards card to receive a reward credit. In another example, the customer may be prompted to interact with the loyalty terminal to receive a wireless communication including the reward (e.g., to a mobile device). Other modifications of the method 500 are possible without straying from the intent and purpose of the method 500.

Figure 6A:
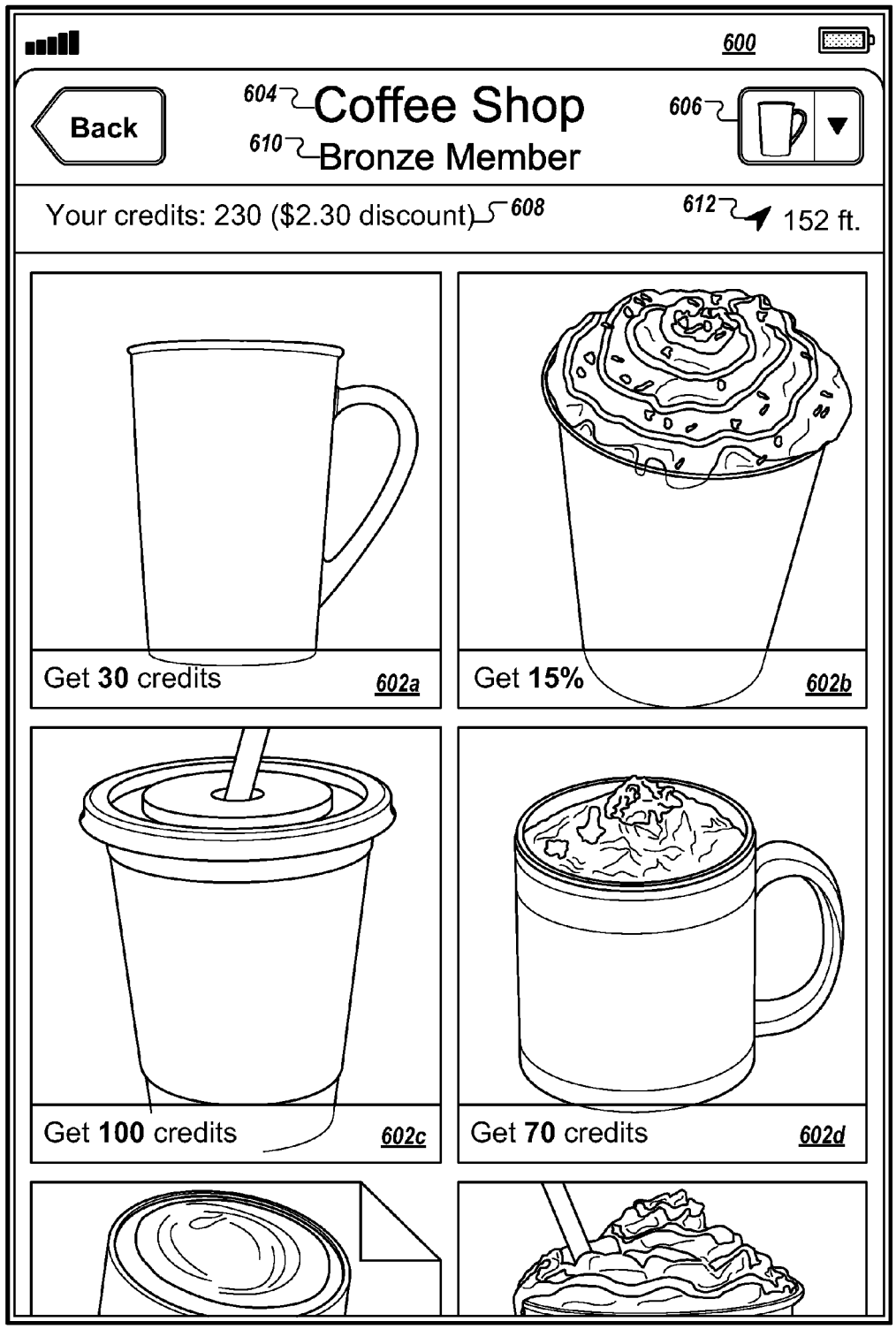
FIGS. 6A and 6B are screen shots of example user interfaces for a mobile application configured to manage a loyalty program customer account and transaction data.
Figure 6B:
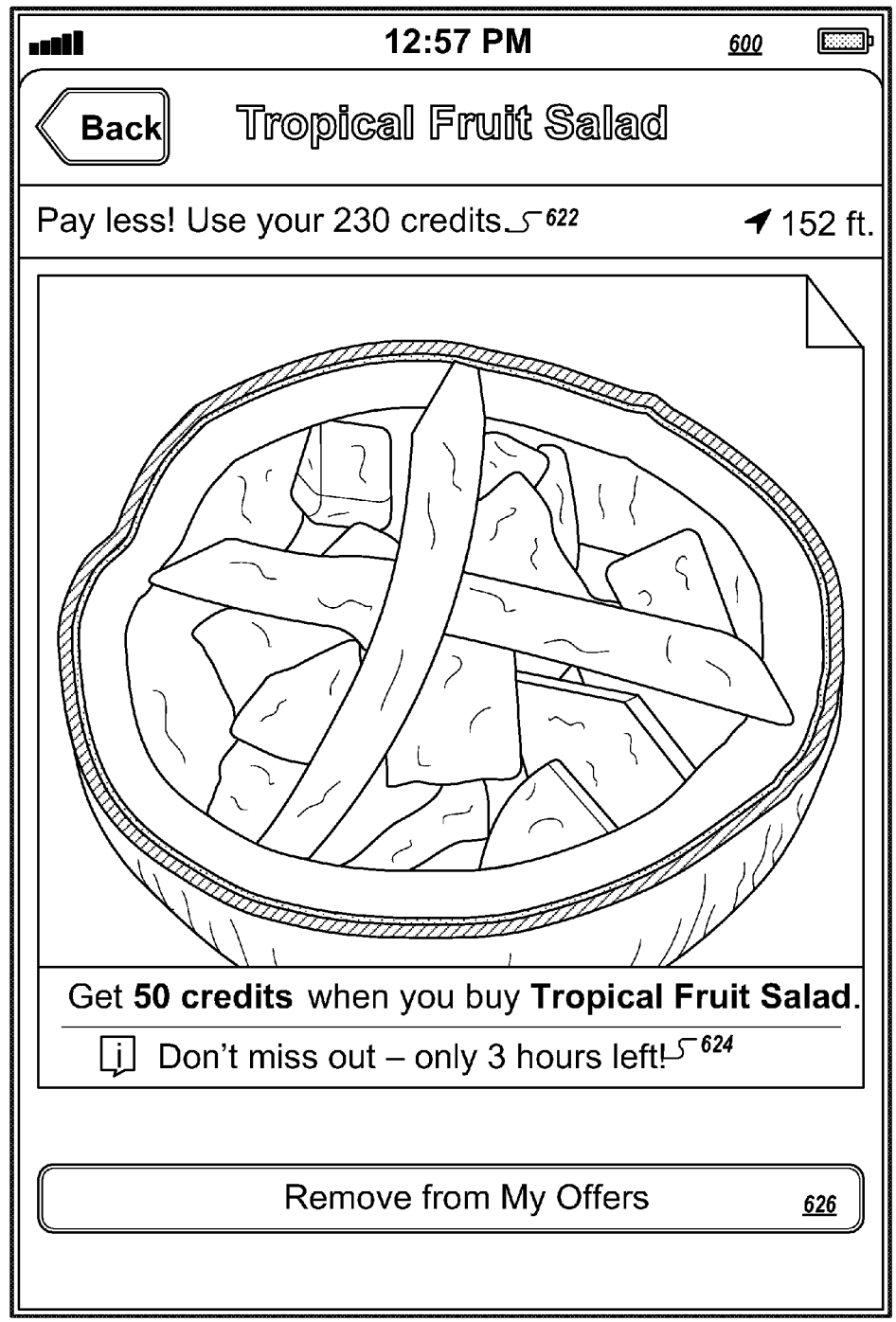

FIGS. 6A and 6B are screen shots of example user interfaces for a browser-based or mobile loyalty rewards application configured to manage a loyalty program customer account and transaction data. The loyalty rewards application, for example, may be installed upon the mobile device 160 (e.g., as described in relation to FIG. 1B) or accessed via a browser application running on the mobile device 160. The loyalty rewards application, in some implementations, is configured to manage electronic receipt information, present a number of offers available through one or more entities associated with one or more loyalty programs, and track rewards accumulated through the one or more loyalty programs. Additionally, in some implementations, the loyalty rewards application is configured to transmit customer identification information to a loyalty terminal, such as the loyalty terminal 154 described in relation to FIG. 1B. Furthermore, in some implementations, the loyalty rewards application is configured to present a customer with statistical analysis regarding transactions and/or issue reminders regarding potential future transactions based in part upon analysis of historic transactions. For example, the loyalty rewards application may be configured to identify that the customer purchases dog food every six weeks and, upon reaching six weeks, remind the customer to pick up a bag of dog food. In some implementations, the loyalty rewards device application is configured to identify geolocation information regarding the mobile device and provide information to the user based in part upon the geolocation information. For example, the loyalty rewards application may be configured to identify a preference of the customer to purchase a morning cup of coffee on a substantially regular basis, recognize that the mobile device is in a different location than a typical neighborhood, and provide an address and/or directions to the nearest coffee shop of the preferred retailer.

As shown in FIG. 6A, a first screen shot 600 includes presentation of a number of offers 602 in relation to a first vendor 604. The first screen shot 600, in some implementations, is presented to a customer upon selection of the first vendor 604. For example, using a drop-down menu 606, the customer may switch between a number of vendors. In some implementations, the drop-down menu 606 presents a number of vendors having loyalty programs managed through the loyalty rewards application. The customer, for example, is a member of the loyalty program of each vendor presented via the drop-down menu 606.

In relation to the first vendor 604, the customer is presented with the offers 602, each offer being associated with a particular discount and/or reward. A present reward value 608, illustrated above the offers 602, identifies an accrual of reward credits (e.g., points) related to the first vendor 604. As illustrated, in the present example, rewards credits may be used as a cash value during a transaction at the first vendor 604. In other implementations, a present reward value 608 may identify a percentage completion in regards to a particular reward. For example, in the manner of an electronic punch card, the present reward value 608 may instead identify a total number of a product purchased in relation to the threshold number to obtain a free product (e.g., buy twelve sandwiches, get the thirteenth free). In some implementations, two or more present reward values may be illustrated. For example, in relation to a grocery store with a deli section, the user may accrue points towards a free rotisserie chicken in a buy-on-get-one rewards program, plus a credit for an affiliated gas station based upon total purchases. Any combination and/or number of reward values may be associated with a particular vendor.

To encourage the customer to earn additional rewards, in some implementations, the first vendor 604, in some implementations, provides a variety of offers 602 (e.g., discounts and rewards opportunities) through the loyalty rewards application. In some implementations, the loyalty rewards application may present only a portion of all existing offers to the customer. In some examples, the offers 602 may be selected based at least in part on a membership level 610 (e.g., a relative assessment of how loyal a customer the current customer is to the first vendor 604), a time of day (e.g., breakfast offers may be presented until 9:30 a.m., lunch offers may be presented until 2:00 p.m., etc.), a current location of the mobile device in relation to the nearest location of the first vendor 604 (e.g., only certain branches may participate in particular offers, only particular outlets may feature a particular product such as breakfast items or espresso-based coffees), and/or user profile information (e.g., customer is vegetarian, customer is a diabetic, customer does not own a car, customer has children, customer has no pets, etc.).

In some implementations, a geolocator capability (e.g., global positioning service (GPS), etc.) of the mobile device may be called upon to determine a current location of the mobile device in relation to the first vendor 604. For example, as illustrated a distance indicator 612 has located a branch of the first vendor 604 within 152 feet of the mobile device.

Upon selection of a particular offer 602, in some implementations, the loyalty rewards application presents the user with detailed information regarding the selected offer 602. For example, turning to FIG. 6B, a screen shot 620 includes a description of a reward in the form of a number of credits for purchasing a tropical fruit salad. Additionally, a reward availability notice 622 informs the customer that a credit of 10 points may be applied to the purchase of the tropical fruit salad. An availability message 624 indicates a relative availability of the tropical fruit salad. In other examples, an availability notification may provide an estimated wait for obtaining an oil change, a number of reservations left for a shoulder massage, or a closest available dealer with a particular product in stock.

Beneath the availability message, a removal control 626 provides the user the opportunity to remove the offer from the list. Removal of the offer, for example, may be considered as an indication of lack of interest in a particular offer (e.g., the customer dislikes tropical fruit salads). In some implementations, responsive to removal of an offer, the offer will be demoted (e.g., within future presentation of available offers) or will be blocked from being offered to this customer in the future. Upon returning to the first screen shot 600, for example, the user should no longer see the tropical fruit salad offer within the offers 602.

To redeem an offer, in some implementations, the user may present an offer code (not illustrated) and an identification as a member of the loyalty program (e.g., telephone number, loyalty program card, transmission from the loyalty program mobile application to a loyalty terminal, etc.) to redeem one of the offers 602, such as the tropical fruit salad offer. In other implementations, an offer may be automatically applied to the electronic account of a member of the loyalty program upon identification of the electronic account at the point of sale. For example, a user may have previously selected (e.g., "liked", accepted, or otherwise indicated an interest in) a particular offer good towards a purchase at a vendor. Upon making the particular purchase (e.g., a purchase of a particular item, a purchase of at least a threshold dollar amount, etc.), the electronic account may be automatically credited the reward value of the offer.

In some implementations, upon redemption of the offer, the offer no longer appears within the offers 602. In some examples, a particular offer may be available to a customer for a single use, upon a particular schedule (e.g., once per week, once per month, etc.), or on a rolling basis (e.g., four weeks after the most recent redemption of the offer).

Figure 7:
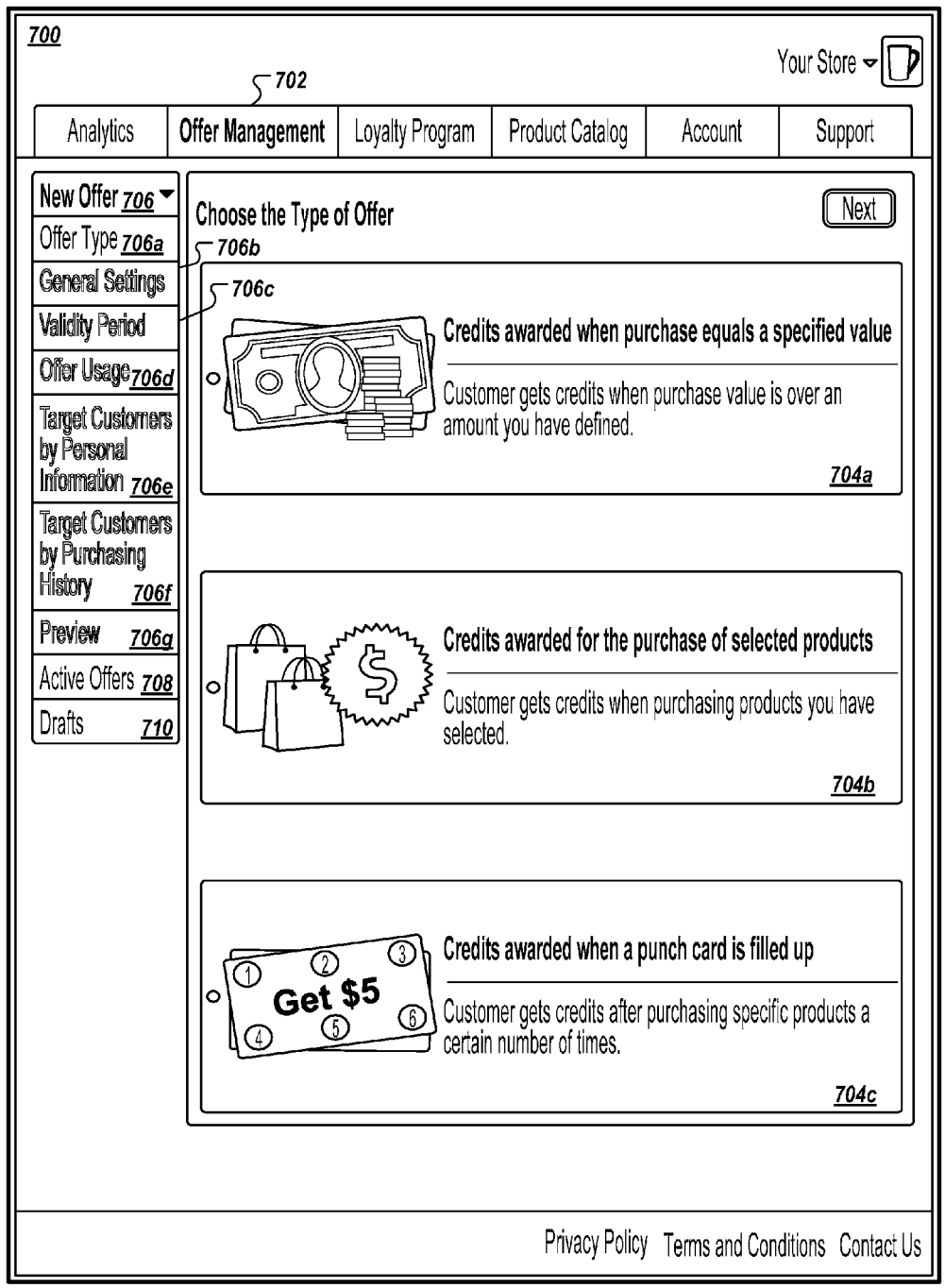
FIG. 7 illustrates a screen shot of an example offer management interface of a loyalty program and transaction data management application.

An entity, in some implementations, populates offers for presentation to customers through an offer management interface of a loyalty program vendor program. Turning to FIG. 7, a screen shot 700 of an example loyalty program and transaction data management application includes an offer management interface 702. Through the offer management interface 702, a user can define a number of offers for presentation to customers, for example through a loyalty program electronic account. The offer management interface 702, as illustrated, includes options of a variety of offer templates 704 such as a credit towards total purchase offer 704a, a credit towards product purchase offer 704b, and a punch card offer 704c. The offer templates 704, in some implementations, are presented to a user in response to selecting a new offer menu 706.

The new offer menu 706, for example, navigates the user through a series of steps in creating a new offer including, for example, an offer type 706a (e.g., currently active), general settings 706b, validity period 706c, offer usage 706d, customer profile 706e, purchase history 706f, and preview 706g. Within the general settings step 706b, for example, the user may upload an image related to the offer, write a brief description of the offer, and set a reward value related to the offer (e.g., number of purchase, amount of purchase to award credit, etc.). Moving to the validity period step 706c, in some implementations, the user may establish a start time and an end time for the offer. Furthermore, in some implementations, the validity period step 706c may include identifying a reoccurrence of the offer (e.g., every Thursday, every day at noon, etc.). Turning to the offer usage step 706d, in some examples, the user may specify whether an offer is combinable (e.g., may not be applicable if a credit, coupon, voucher, gift certificate, or other discount is applied to the offer), and/or other terms of validity (e.g., dine in but not takeout, etc.). The personal information step 706e, in some implementations, provides the user the ability to target a subset of customers based in part upon personal information (e.g., home address region, age group, females, etc.). Turning to the purchase history step 706f, in some implementations, a user is provided the opportunity to limit an offer to customers based upon purchase history (e.g., customers who have previously made over X dollars in purchases are eligible for the offer, customers who have previously purchased allergy remedies are eligible for the offer, etc.). Finally, at the preview step 706g, the user may look at a preview of the new offer.

At some point during the creation of a new offer (e.g., within the menu steps 706a through 706g), the user may suspend work on the new offer. Beneath the new offer menu 706, a drafts menu 710, when selected, provides the user the opportunity to return to creating a new offer. Upon creation of the new offer, the offer may be added to a set of active offers. Active offers, for example, may be served to users via a loyalty rewards program mobile application, a set of active offers presented via a web site of the entity, or as injection information injected into the print stream as a coupon or reward at the point of sale along with a receipt. An active offers menu 708, when selected, may provide the user the opportunity to review, edit, and/or remove existing offers.

Figure 8A:
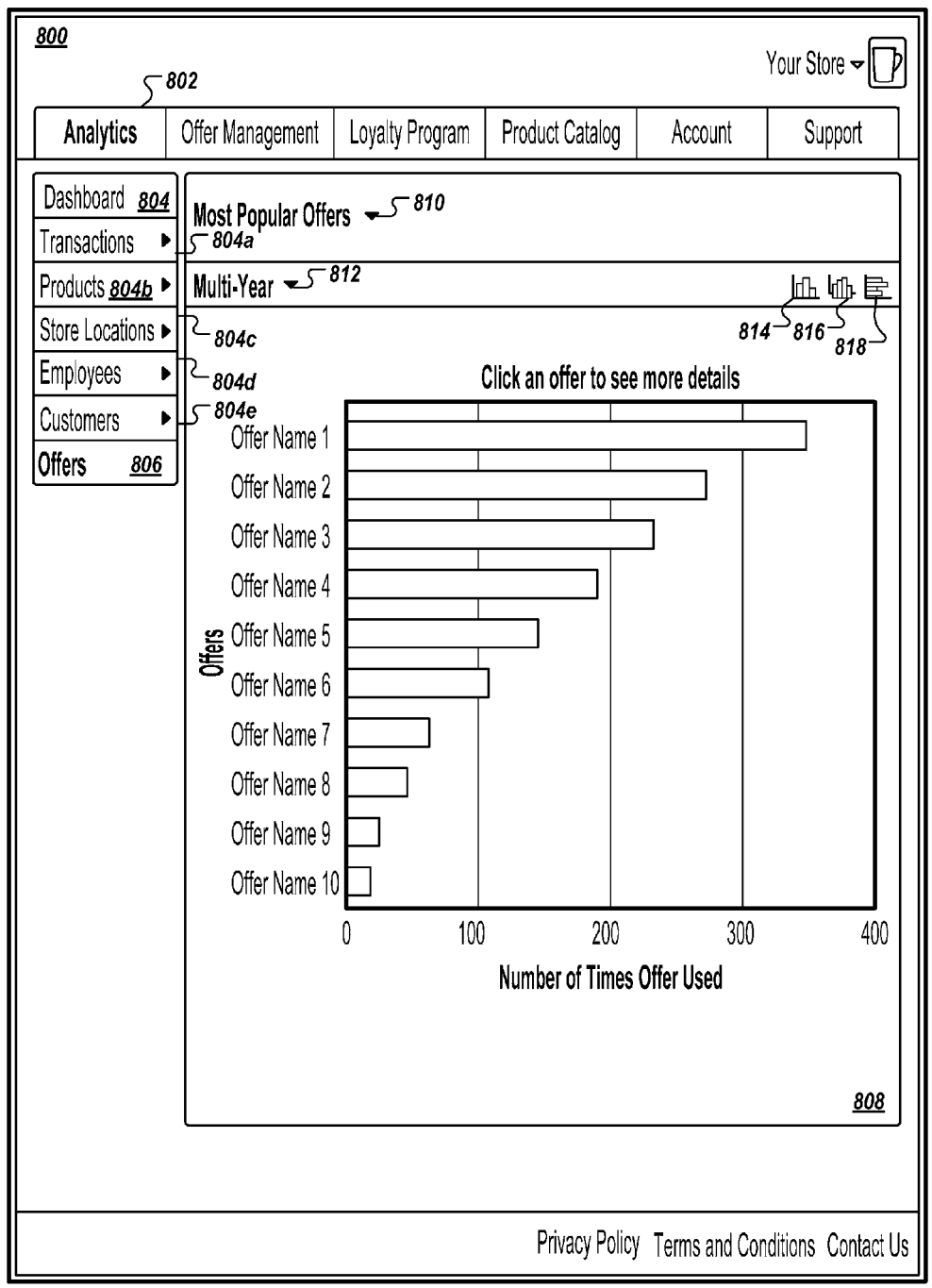
FIGS. 8A and 8B are screen shots of example user interfaces for reviewing statistical information related to a loyalty program and transaction data management application.
Figure 8B:

FIGS. 8A and 8B are screen shots of example user interfaces for an application configured to present statistical information related to transaction data. The screen shots, in some implementations, illustrate additional functionality of the same loyalty program and transaction data management application illustrated in regard to the screen shot 700, described in relation to FIG. 7.

An analytics interface 802, for example, is selected from the loyalty program and transaction data management application, and an offers menu option 806 is active. Within a main view 808 of the analytics interface 802, a bar graph illustrates relative popularity of offers in relation to the number of times each of the offers has been used by a customer. The bar graph, for example, may have been generated in response to selection of a "most popular offers" graph option 810. For example, the graph option 810 includes a drop-down menu control for switching the analytic associated with available offers. Other options, in some examples, may include "least popular offers", "offers most frequently declined by users", and "revenue generated per offer."

Beneath the graph option 810, a timeframe option 812 of "multi-year" is illustrated as having been selected. The timeframe option 812 includes a drop-down menu control for switching between various timeframes. Other options, in some examples, may include "past four weeks," "one year," and "days of the week." Furthermore, although illustrated as a horizontal bar graph (e.g., as presented based upon selection of a horizontal bar graph control 818), in some implementations, a user may select a vertical bar graph control 814 or a vertical three-dimensional bar graph control 816 to see the data displayed in different formats. Other metrics and graphing formats are possible.

In addition to the offers menu option 806, additional menu options are available. For example, a dashboard menu option 804 includes a set of sub-options such as a transactions option 804a, a products option 804b, a store locations option 804c, an employees option 804d, and a customers option 804e. Selection of the dashboard menu option 804, in some implementations, triggers the display of a dashboard overview of the operations associated with a particular entity, for example as illustrated in relation to FIG. 8B.

Turning to FIG. 8B, a screen shot 820 illustrates an example dashboard view within the main view 808 of the analytics interface 802. The dashboard view, for example, illustrates a current snapshot of the status of transactions, revenue, and offer activity for the present day. A user may review the dashboard view to obtain a general understanding of recent activity related to a particular store, a region, or all locations, as selected through a scope menu 830.

In a top portion of the main view 808, a transaction synopsis region 822 provides an overview of the number of transactions and a value of the transactions, broken out by hourly time periods. In some implementations, the transactions overview may be referenced in relation to a baseline (e.g., 21-day average, monthly average, annual average on Tuesdays, five year average of the particular day of the week in the particular month, etc.).

Beneath the transaction synopsis region 822, a top product sales region 824 identifies the N (e.g., ten) most popular products of the day by number of sales. In other implementations, rather than top product sales (e.g., as less expensive items may be purchased more frequently than more expensive items), a list of top products by revenue may be displayed.

Next to the top product sales region 824, a credits overview region 826 is displayed above an offers overview region 828.

The credits illustrated within the credits overview region 826b, in some implementations, relate to credits obtained through a loyalty rewards program. For example, credits may have been earned by a number of customers throughout the day by accepting offers presented within a loyalty program application. In further examples, customers may have earned credits by redeeming offers presented within email messages, paper reward certificates provided to the customers, text message offers transmitted to customers, or other offer transmissions provided to customers by the retailer, entity, or organization. Conversely, credits previously earned by customers of a loyalty program may have been redeemed throughout the given day to purchase products or services. Additionally, in some implementations, a total number of outstanding (e.g., unredeemed) credits held by a number of members of a customer loyalty rewards program may be listed.

Turning to the offers overview region 828, a list of N (e.g., five) offers is listed, where each offer is associated with a metric (e.g., number of customers who redeemed the offer). A pop-up region 832 is illustrated above a first offer 834a. The pop-up region 832, in some examples, may be presented in response to selection of the first offer 834a or a mouse-over or hover of the first offer 834a. Within the pop-up region 832, a more detailed synopsis related to the first offer 834a is presented. In some examples, the detailed synopsis includes a number of times the first offer was viewed by a customer (e.g., served to a display of a loyalty programs mobile device application executing on the mobile device of a customer, served to a browser-based electronic account of a loyalty rewards program, etc.), a number of times the offer was saved by a customer (e.g., selected to be placed in a "saved offers" section of a loyalty programs application, such that the customer may return to the saved offer to complete a transaction), a number of times the offer was used by a customer (e.g., to complete a transaction), a total sales value associated with the use of the offer, and a percentage metric identifying the relative frequency a user completed a transaction using a previously saved offer. A user may review the offers overview region 828, for example, to gain information regarding successful offers. Information on the actual content of the offer, in some implementations, may be provided upon drilling down lower within the analytics (e.g., through selection of the first offer 834a, selection of the pop-up window 832, or search for the first offer 834a within the offers menu 806).

Additional regions of analytics information are possible. In some implementations, the dashboard view includes a punch card activity overview, a customer traffic overview (e.g., as related to website visits), and a top revenues by location overview (e.g., for a multi-location entity). Additionally, in other implementations, the information may be presented in different formats (e.g., graphically, textually, etc.) or in a different layout. The present layout and information provided within the dashboard view, in some implementations, may be designated in part through program setup options.

Figure 9:
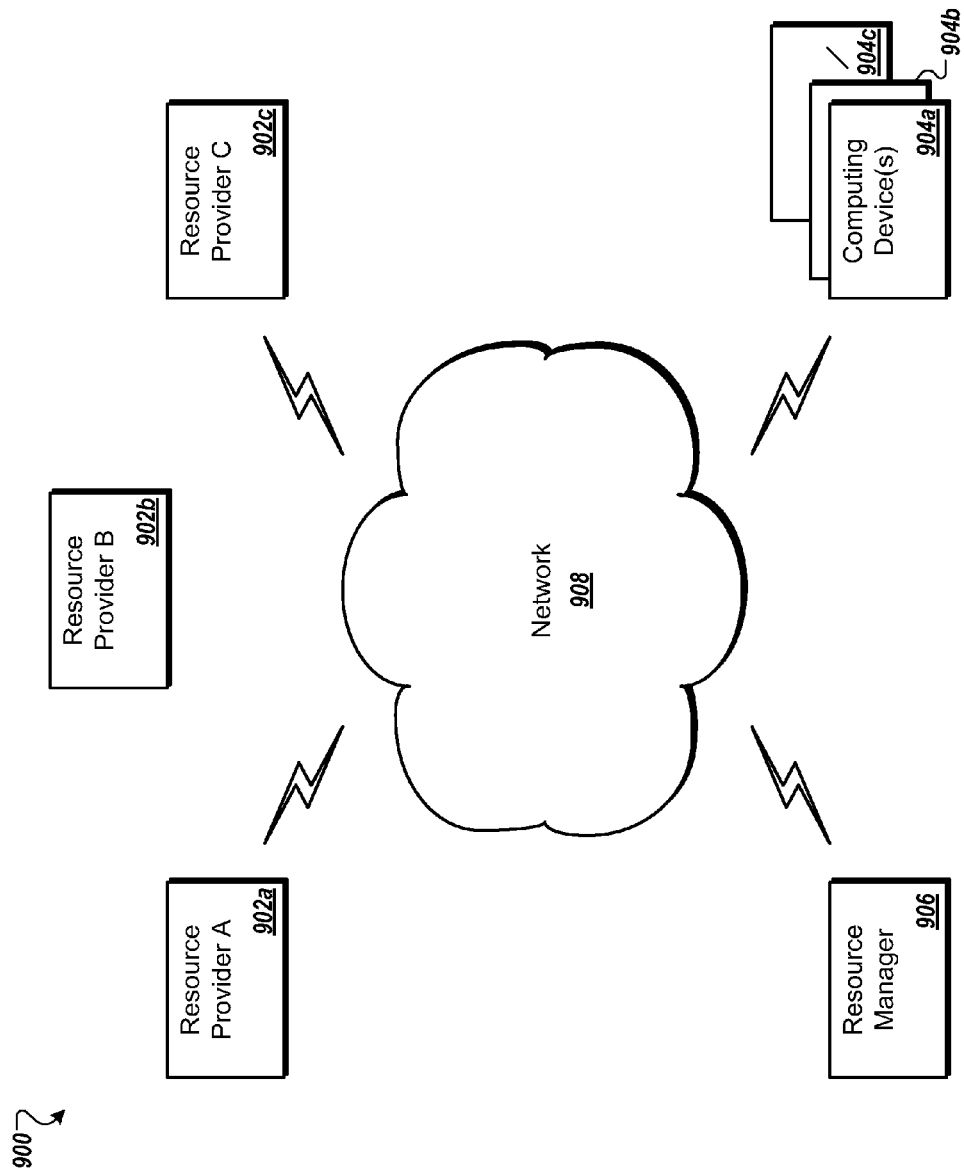
FIG. 9 is a block diagram of an example network environment for collecting and manipulating transaction data at point of sale.

As shown in FIG. 9, an implementation of an exemplary cloud computing environment 900 for collection and manipulation of transaction data is shown and described. The cloud computing environment 900 may include one or more resource providers 902a, 902b, 902c (collectively, 902). Each resource provider 902 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 902 may be connected to any other resource provider 902 in the cloud computing environment 900. In some implementations, the resource providers 902 may be connected over a computer network 908. Each resource provider 902 may be connected to one or more computing device 904a, 904b, 904c (collectively, 904), over the computer network 908.

The cloud computing environment 900 may include a resource manager 906. The resource manager 906 may be connected to the resource providers 902 and the computing devices 904 over the computer network 908. In some implementations, the resource manager 906 may facilitate the provision of computing resources by one or more resource providers 902 to one or more computing devices 904. The resource manager 906 may receive a request for a computing resource from a particular computing device 904. The resource manager 906 may identify one or more resource providers 902 capable of providing the computing resource requested by the computing device 904. The resource manager 906 may select a resource provider 902 to provide the computing resource. The resource manager 906 may facilitate a connection between the resource provider 902 and a particular computing device 904. In some implementations, the resource manager 906 may establish a connection between a particular resource provider 902 and a particular computing device 904. In some implementations, the resource manager 906 may redirect a particular computing device 904 to a particular resource provider 902 with the requested computing resource.

Figure 10:
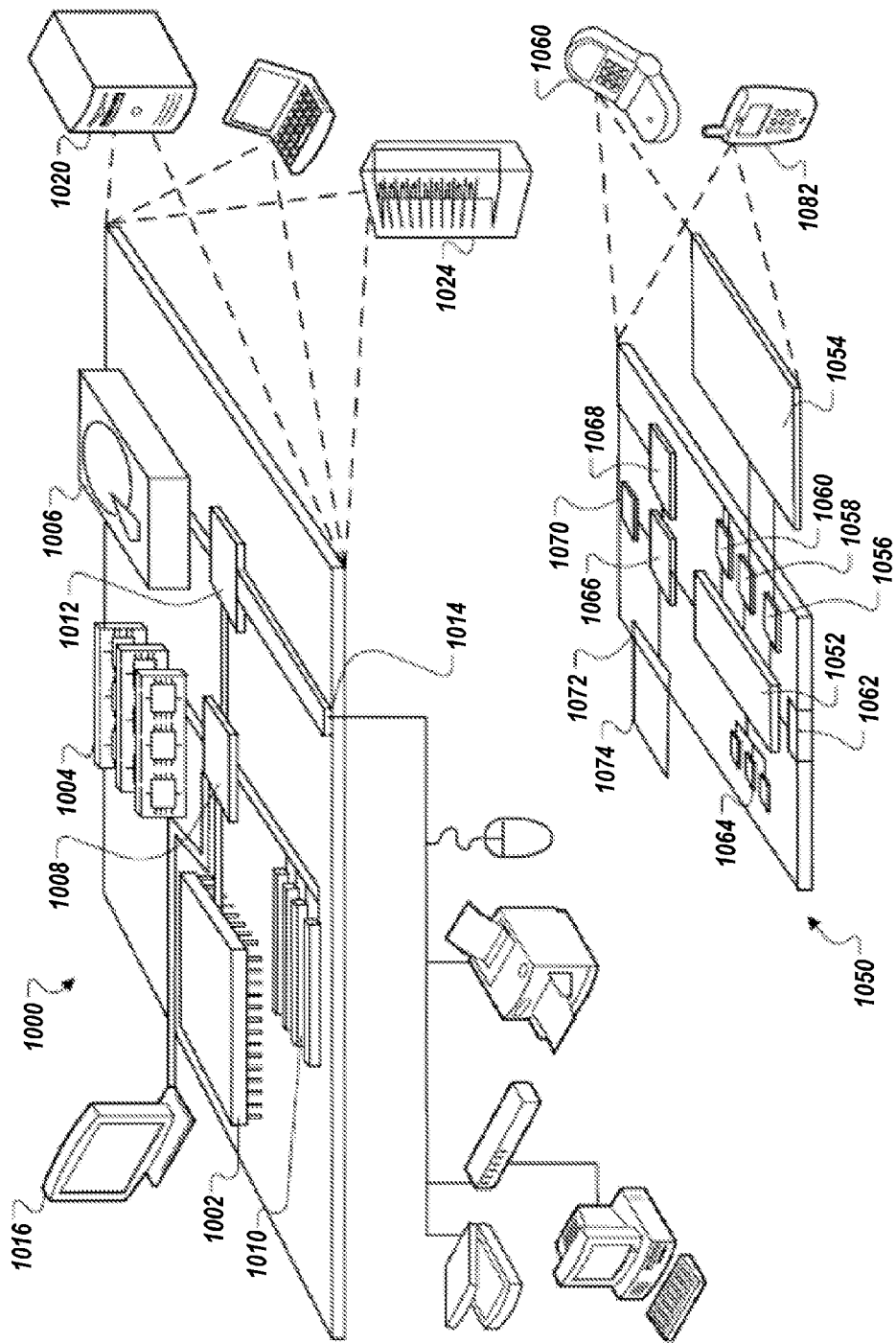
FIG. 10 is a block diagram of a computing device and a mobile computing device.

FIG. 10 shows an example of a computing device 1000 and a mobile computing device 1050 that can be used to implement the techniques described in this disclosure. The computing device 1000 is intended to represent various forms of digital computers, such as laptops, desktops, workstations, personal digital assistants, servers, blade servers, mainframes, and other appropriate computers. The mobile computing device 1050 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1002), perform one or more methods, such as those described above. The instructions can also be stored by one or more storage devices such as computer- or machine-readable mediums (for example, the memory 1004, the storage device 1006, or memory on the processor 1002).

The high-speed interface 1008 manages bandwidth-intensive operations for the computing device 1000, while the low-speed interface 1012 manages lower bandwidth-intensive operations. Such allocation of functions is an example only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provide as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1052), perform one or more methods, such as those described above. The instructions can also be stored by one or more storage devices, such as one or more computer- or machine-readable mediums (for example, the memory 1064, the expansion memory 1074, or memory on the processor 1052). In some implementations, the instructions can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth®, Wi-Fi™, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone 1080. It may also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, an apparatus and method for collecting and manipulating transaction data are provided. Having described certain implementations of methods and apparatus for supporting collecting and manipulating transaction data, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. An apparatus comprising:
   a first I/O port configured for connection to a point of sale device;
   a second I/O port configured for connection to a purchase recording device, wherein the second I/O port is of a same type as the first I/O port, wherein
      the second I/O port is connected to the first I/O port such that data passed into the first I/O port is allowed to pass through the apparatus to the second I/O port unimpeded in at least a first operating mode;
   a processor; and
   a non-transitory computer readable medium storing instructions thereon wherein the instructions, when executed, cause the processor to, upon connection of the first I/O port to the point of sale device and connection of the second I/O port to the purchase recording device:
      extract information passed from the point of sale device connected to the first I/O port to the purchase recording device connected to the second I/O port while the information passes unimpeded to the purchase recording device,
      identify, from the information, a particular type of data stream;
      after identifying the particular type of data stream, collect, from further information passed from the point of sale device to the purchase recording device, data associated with the identified data stream,
      identify, from the data associated with the identified data stream, transaction data; and
      provide, to an external computing device, the transaction data.

2. The apparatus of claim 1, further comprising a third I/O port, wherein
   the third I/O port is configured for connection to the external computing device; and
   providing the transaction data comprises transmitting the transaction data via the third I/O port.

3. The apparatus of claim 1, further comprising a communication port, wherein the communication port is configured to connect to a network communications device, and
providing the transaction data comprises transmitting the transaction data via the network communications device.

4. The apparatus of claim 3, wherein the network communications device comprises one of a modem, a router, a hub, and a gateway.

5. The apparatus of claim 1, further comprising an antenna, wherein providing the transaction data comprises transmitting the transaction data via the antenna.

6. The apparatus of claim 1, wherein a connection between the second I/O port and the first I/O port is configured to pass data through the apparatus while the apparatus is disconnected from all power sources.

7. The apparatus of claim 1, further comprising a third I/O port and a fourth I/O port, wherein:
   the fourth I/O port is connected to the third I/O port such that data passed into the third I/O port is allowed to pass through the apparatus to the fourth I/O port unimpeded in at least a first operating mode, and
   each of the third I/O port and the fourth I/O port comprises a USB connector.

8. The apparatus of claim 1, wherein, in a second operating mode, the instructions cause the processor to:
   buffer at least a portion of the data received at the first I/O port; and
   forward at least a portion of the buffered data to the purchase recording device via the second I/O port.

9. The apparatus of claim 8, wherein, in the second operating mode, the instructions cause the processor to introduce injection data to the purchase recording device via the second I/O port prior to forwarding the at least a portion of the buffered data.

10. The apparatus of claim 8, wherein buffering the portion of the data comprises temporarily storing the portion of the data in a buffer region of a storage medium.

11. The apparatus of claim 10, wherein the non-transitory computer readable medium comprises the storage medium.

12. A method comprising:
   extracting, by an intermediary device installed between a point of sale computing device and a purchase recording device, information passed from the point of sale computing device to the purchase recording device, wherein
      the intermediary device is configured to collect at least a portion of the information while the information passes between the point of sale computing device and the purchase recording device unimpeded by the intermediary device;
   identifying, from the information, a particular type of data stream;
   after identifying the particular type of data stream, collecting, from further information passed from the point of sale device to the purchase recording device data associated with the identified data stream,
   identifying, from the data associated with the identified data stream, transaction data; and
   providing, to an external computing device, the transaction data.

13. The method of claim 12, further comprising:
   identifying, from the information, printing instructions; and
   responsive to identifying the printing instructions, buffering the information, identifying injection information for injecting into a print stream, wherein the print stream is provided by the point of sale computing device to the purchase recording device, and injecting the injection information prior to transmission of a portion of the print stream to the purchase recording device.

14. The method of claim 12, further comprising:
identifying, from the transaction data, sensitive information; and
prior to providing the transaction data, applying a security algorithm to the sensitive information.

15. The method of claim 12, wherein providing the transaction data comprises providing, to a remote server via a network, the transaction data.

16. The method of claim 15, wherein providing the transaction data comprises providing at least a portion of the transaction data to a payment terminal.

17. The method of claim 16, wherein the payment terminal is connected to the intermediary device via a wired connection.

18. The method of claim 16, wherein identifying the transaction data comprising filtering the information to identify at least one of a product name, a product type, and a price.

19. The method of claim 18, further comprising:
analyzing the transaction data; and
matching an offer based upon at least one of a threshold purchase quantity, a threshold cost, a product type, and a product name.

20. The method of claim 19, further comprising determining, based upon the offer, print instructions for injection to a print stream destined for the purchase recording device.

21. A system comprising:
a data extraction device comprising:
a first I/O port configured for connection to a point of sale device;
a second I/O port configured for connection to a purchase recording device, wherein the second I/O port is of a same type as the first I/O port, wherein
the second I/O port is connected to the first I/O port such that data passed into the first I/O port is allowed to pass through the apparatus to the second I/O port unimpeded in at least a first operating mode;
a communications channel configured for communication with a computing device, wherein the computing device is configured to collect transaction data extracted by the data extraction device;
a processor; and
a non-transitory computer readable medium storing a set of instructions that, when executed by the processor, cause the processor to, upon connection of the first I/O port to the point of sale device and connection of the second I/O port to the purchase recording device:
extract information passed from the point of sale device connected to the first I/O port to the purchase recording device connected to the second I/O port while the information passes unimpeded to the purchase recording device; and
provide at least a portion of the information to the computing device.

22. The apparatus of claim 1, wherein the particular type of data stream is a print stream and the data associated with the identified data stream is print stream data.

* * * * *